United States Patent
Goehring et al.

(10) Patent No.: US 12,526,326 B1
(45) Date of Patent: *Jan. 13, 2026

(54) TECHNIQUES FOR SHARING NETWORK APPLICATIONS

(71) Applicant: Amazon Technologies, Inc., Seattle, WA (US)

(72) Inventors: David Guadalupe Goehring, Riverside, CA (US); Paul-Michel DeBlois, Kirkland, WA (US); Mustafa Hakim, Tustin, CA (US); Timothy Chang, Arcadia, CA (US); Raghunath Chirravuri, Long Beach, CA (US); Sarah Kyung Kim, Seattle, WA (US); Jediah Conachan, Seattle, WA (US); Kathryn Lynn Fukuda, Irvine, CA (US); Keegan Robert Cox, Bellevue, WA (US); Brian Fisher, Lake Forest, CA (US); Jared Haren, Lake Forest, CA (US); Lanvi Nguyen, Tustin, CA (US); Samuel Adam Salameh, Rancho Santa Margarita, CA (US); George Tsipolitis, Irvine, CA (US); Alan Zambrano, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/793,405

(22) Filed: Aug. 2, 2024

Related U.S. Application Data

(63) Continuation of application No. 17/850,963, filed on Jun. 27, 2022, now Pat. No. 12,074,917.

(51) Int. Cl.
*H04L 65/1069* (2022.01)
*A63F 13/35* (2014.01)
(Continued)

(52) U.S. Cl.
CPC .......... *H04L 65/1069* (2013.01); *A63F 13/35* (2014.09); *A63F 13/86* (2014.09); *H04L 67/10* (2013.01)

(58) Field of Classification Search
CPC ...... H04L 65/1069; H04L 67/10; A63F 13/35; A63F 13/86; A63F 13/87
(Continued)

(56) References Cited

U.S. PATENT DOCUMENTS 9,573,062 B1 * 2/2017 Long ...................... G11B 27/00
10,112,110 B1 10/2018 Garavito et al.
(Continued)

OTHER PUBLICATIONS

Office Action for U.S. Appl. No. 17/850,963, mailed on Jun. 22, 2023, David Guadalupe Goehring, "Techniques for Sharing Network Applications", 17 pages.
(Continued)

*Primary Examiner* — Meng Vang
(74) *Attorney, Agent, or Firm* — Nicholson De Vos Webster & Elliott LLP

(57) ABSTRACT

This disclosure describes, in part, techniques for sharing content associated with network applications. For instance, a user may want to share content for a network application, such as a game stream for a gaming application. As such, system(s) may launch a broadcasting session on a first virtual server and launch the network application on a second virtual server. The first virtual server may then receive content data representing states of the network application from the second virtual server. Additionally, the first virtual server may receive video data representing the user and/or audio data representing user speech from a user device. The first virtual server may then generate broadcasting data using the content data, the video data, and the audio data. After generating the broadcasting data, the system(s)

(Continued)

may send the broadcasting data to one or more computing devices associated with a user account.

20 Claims, 13 Drawing Sheets

(51) Int. Cl.
 *A63F 13/86* (2014.01)
 *H04L 67/10* (2022.01)
(58) Field of Classification Search
 USPC .......................................................... 709/227
 See application file for complete search history.

(56) References Cited

U.S. PATENT DOCUMENTS

| 10,722,793 | B2* | 7/2020 | Paradise | ............... | A63F 13/352 |
| 10,821,357 | B1* | 11/2020 | Rotelli | ................. | H04L 67/141 |
| 11,071,919 | B2 | 7/2021 | Willette et al. | | |
| 2013/0086202 | A1* | 4/2013 | Connelly | .................. | G06F 8/61 |
| | | | | | 709/217 |
| 2014/0282111 | A1* | 9/2014 | Gurbag | ................. | H04L 65/403 |
| | | | | | 709/204 |
| 2017/0001111 | A1* | 1/2017 | Willette | .................. | A63F 13/49 |
| 2017/0072317 | A1* | 3/2017 | Nishikawa | .............. | A63F 13/56 |
| 2022/0226736 | A1 | 7/2022 | Hsiung | | |

OTHER PUBLICATIONS

Office Action for U.S. Appl. No. 17/850,963, mailed on Jan. 31, 2024, David Guadalupe Goehring, "Techniques for Sharing Network Applications", 29 pages.

* cited by examiner

TECHNIQUES FOR SHARING NETWORK APPLICATIONS

CROSS-REFERENCE TO RELATED APPLICATIONS

This application is a continuation of, and claims priority to, U.S. patent application Ser. No. 17/850,963, filed on Jun. 27, 2022, entitled "Techniques For Sharing Network Applications," which are incorporated in its entirety by reference.

BACKGROUND

As gaming has become popular, users have created new techniques for sharing their gaming experiences with other users. For example, while playing a game, a user may broadcast the game session to a service which allows other users to view the game session, view a video of the user during the game session, and/or communicate with the user. However, broadcasting a game session may be difficult for many users. For instance, in order to broadcast a game session, a user may be required to download broadcasting software on his or her device. The user then needs to install and configure the broadcasting software on the device such that the device is able to use to broadcasting software to broadcast the user's game session. Additionally, if problems occur with the broadcasting software, the user needs to both identify the problem as well as determine how to fix the problem in order to again stream the game session.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
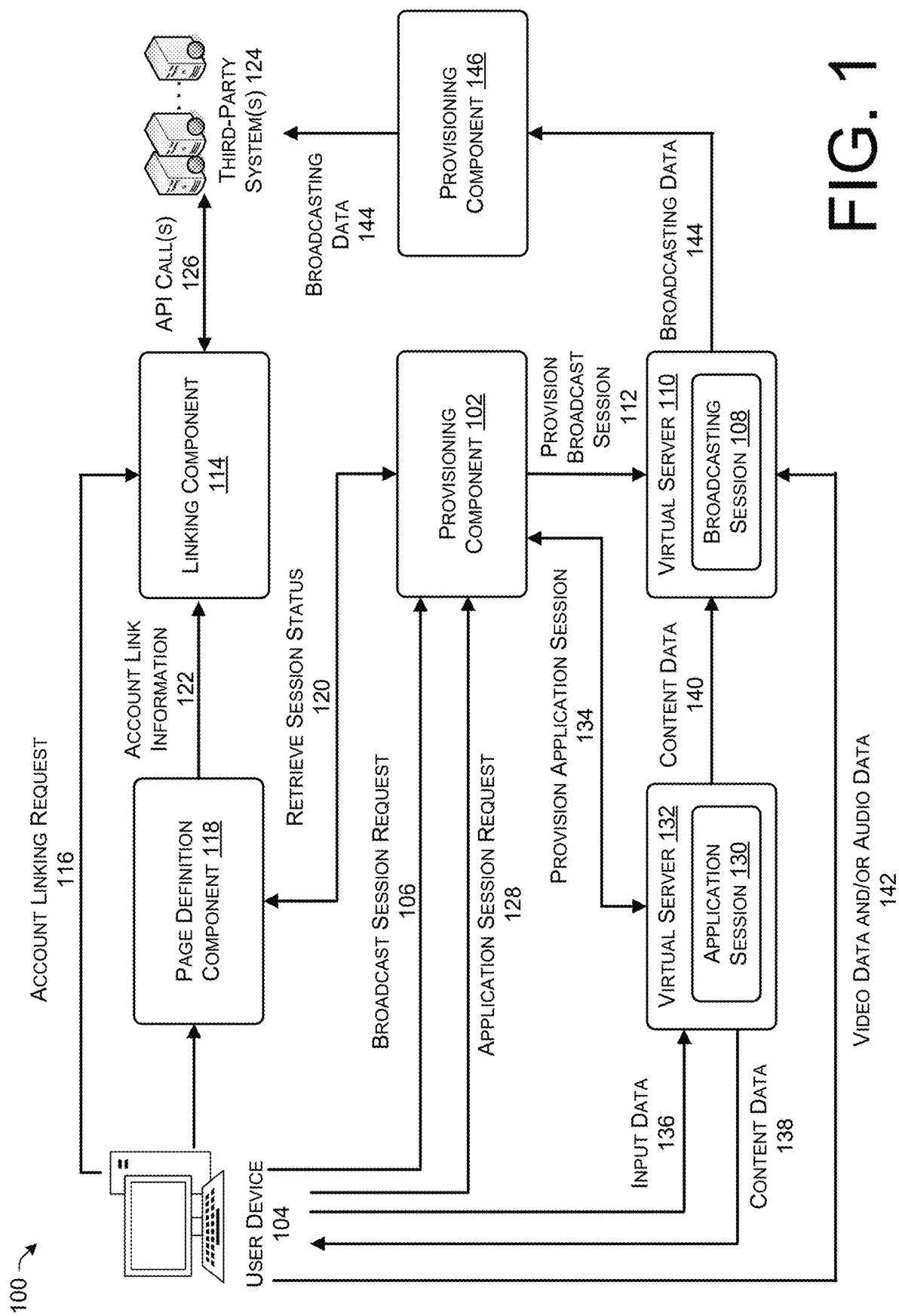
FIG. 1 illustrates an example environment for sharing network applications, in accordance with examples of the present disclosure.

This disclosure describes, in part, techniques for sharing network applications, such as games, with other users. For instance, system(s) may receive, from a user device, a request to broadcast a network application. Based on receiving the request, the system(s) may launch a broadcasting session on a virtual server (referred to, in some examples, as a "first virtual server"). Additionally, the system(s) may receive, from the user device, a request to access a network application, such as a game. Based on receiving this request, the system(s) may launch the network application on another virtual server (referred to, in some examples, as a second virtual server). The first virtual server may then receive video data representing a user and/or audio data representing user speech from the user device. Additionally, the first virtual server may receive content data representing states of the network application from the second virtual server. The first virtual server may then generate broadcasting data using the video data, the audio data, and the content data. Additionally, the system(s) (e.g., the first virtual server) may cause broadcasting content represented by the broadcasting data to be provided using one or more third-party systems. This way, other users are able to connect to the third-party system(s) in order to view the broadcasting content.

For more detail, the system(s) may store application data representing various applications that are accessible to users via network(s). As described herein, the applications may include, but are not limited to, gaming applications, word processing applications, educational applications, multimedia applications (e.g., movies, music, etc.), and/or any other type of application. In some examples, the system(s) store the network applications on virtual storage devices. As described herein, a virtual storage device may include a storage volume, such as an Elastic Block Store (EBS), that is stored remotely (e.g., a cloud-based storage) from user devices. In some examples, the system(s) may generate different types of virtual storage devices. For example, the system(s) may generate solid-state drives, hard disk drive, and/or any other type of remote storage drives. After the system(s) generate the virtual storage device, the system(s) may create a file system on the virtual storage device, run a database on the virtual storage device, store a network application on the virtual storage device, and/or perform one or more additional and/or alternative processes with the virtual storage device.

The system(s) may allow users to share their application experiences with other users, such as by broadcasting sessions associated with the network applications. In order to broadcast a network application, a user may initially use a user device to link a local user account with one or more third-party accounts that the user wants to use to broadcast the network application. In some examples, the user may link to a third-party account by providing credentials associated with the user account, such as a username, password, and/or any other information for accessing the third-party account. The system(s) may then store the credentials in association with the local user account. Additionally, using the credentials, the system(s) may create the link with the third-party account. In some examples, to create the link, the system(s) may receive access token(s) and/or the access key(s) associated with the third-party account. The system(s) may then later use the access token(s) and/or the access key(s) to broadcast the network application on third-party system(s) associated with the third-party account, which is described in more detail below.

The system(s) may then receive, from the user device, a request to create a broadcasting session for the local account. In some examples, the request may indicate a type of broadcasting session and/or include a token for the broadcasting session. Based on receiving the request, the system(s) may create the first virtual server for the broadcasting session. As described herein, a virtual server may include a server (e.g., computer and server programs) that executes at a remote location and is used to run applications. For example, the virtual server may include one or more dedicated computing resources, such as central processing units (CPUs), memory, storage, network capacity, and/or the like, for running and providing the application. Once the system(s) create the first virtual server, the system(s) install broadcasting software on the first virtual server. The system(s) may then launch the broadcasting session on the first virtual server for the user, such as by executing a launch file associated with the broadcasting software. Additionally, the system(s) may establish a network connection between the first virtual server and the use device.

The user device may then provide a user interface for configuring the broadcasting session. For example, the user interface may allow the user to select a device for receiving broadcast data (e.g., the video data, the audio data, etc.), turn on a video camera, turn off the video camera, select a location for providing a video captured by the video camera, turn on a microphone, turn off the microphone, enter an identifier (e.g., a name, a title, etc.) associated with the broadcasting session, and/or the like. The user interface may also provide a preview of the broadcasting content that will be provided to other users. Additionally, the user interface may provide one or more tools, such as a chat box, that allows the user to communicate with the other users. Once the user is ready to begin broadcasting, the user may select an interface element, such as a button, on the user interface, where the interface element causes the broadcasting session to begin for the user.

The system(s) may also receive, from the user device, identifier data associated with a network application that the user wants to associate with the broadcasting session. As described herein, identifier data may represent an identifier, such as an alphabetic identifier, a numerical identifier, an alphanumerical identifier, a name, and/or any other type of identifier associated with a network application. In some examples, based on receiving the identifier data, the system(s) may create the second virtual server, install the network application onto the second virtual server (e.g., such as by using the virtual storage device associated with the network application), and launch the network application on the second virtual server. In other examples, the network application may already be installed on the second virtual server. As such, the system(s) may just need to launch the network application on the second virtual server based on receiving the identifier data. In either of these examples, the system(s) may establish a network connection between the second virtual server and the user device. Additionally, the system(s) may establish a network connection between the first virtual server and the second virtual server.

The system(s) may then use the first virtual server to broadcast the network application for the user. For example, the first virtual server may receive, from the user device, the video data representing the video depicting the user accessing the network application. The first virtual server may also receive, from the user device, the audio data representing the user speech from the user. Additionally, the first virtual server may receive, from the second virtual server, content data representing the states of the network application. The first virtual server may then use the video data, the audio data, and the content data in order to generate the broadcasting data for the broadcasting session.

For example, to generate the broadcasting data, the first virtual server may overlay the video depicting the user over a portion of visual content represented by the content data. In some examples, the first virtual server uses the initial configurations from the user in order to perform the overlay. For example, as discussed above, the initial configurations may indicate the location for placing the overlay over the visual content. The first virtual server may also generate the broadcasting data to include the audio data representing the user speech and audio content represented by the content data (e.g., the sound of the network application). After generating the broadcasting data, the system(s) (e.g., the first virtual server) may send the broadcasting data to one or more of the third-party systems that the user linked to the local account. This way, the third-party system(s) are able to use the broadcasting data in order to provide the broadcasting content associated with the network application.

In some examples, the first virtual server may continue to perform these processes while the user is accessing the network application via the second virtual server. For example, and as discussed in more detail below, the second virtual server may continue to receive input data from the user device and update the states of the network application using the input data. The second virtual server may then continue to send, to the user device, updated content data representing the updated states of the network application. Additionally, the second virtual server may send the updated content data to the first virtual server. The first virtual server may then use the updated content data, along with updated video data and/or updated audio data from the user device, to continue to generate updated broadcasting data for the network application. Additionally, the system(s) may continue send this updated broadcasting data to the third-party systems.

In some examples, the system(s) may allow the user to switch between network applications without ending the broadcasting session. For example, while the broadcasting session is still active, the system(s) may receive, from the user device, second identifier data associated with a second network application. In some examples, based on receiving the second identifier data, the system(s) may create a third virtual server, install the second network application onto the third virtual server (e.g., such as by using the virtual storage device associated with the second network application), and launch the second network application on the third virtual server. In other examples, the second network application may already be installed on the third virtual server. As such, the system(s) may just need to launch the second network application on the third virtual server based on receiving the second identifier data. In either of these examples, the system(s) may establish a network connection between the third virtual server and the user device.

Additionally, the system(s) may establish a network connection between the first virtual server and the third virtual server. In some examples, the system(s) establish such a network connection after terminating the network connection between the first virtual server and the second virtual server. Once these network connections are established, the first virtual server may then perform the processes described herein to receive the video data and the audio data from the user device. The first virtual server may then receive content data representing the states of the second network application from the third virtual server. Additionally, the first virtual server may perform the processes described herein in order to generate broadcasting data using the video data, the audio data, and the content data. The system(s) (e.g., the first virtual server) may then send the broadcasting data to the third-party system(s). This way, the system(s) allow the user to switch between network applications without ending the broadcasting session.

In some examples, the system(s) may allow the user to switch to using a second user device without ending the broadcasting session. For instance, while the broadcasting session is still active, the system(s) may receive, from the user device and/or the second user device, an indication to switch the control of the network application to the second user device. Based on receiving the indication, the system(s) may establish a network connection between the second user device and the first virtual server and/or establish a network connection between the second user device and the second virtual server if such network connections are not already established. Additionally, the first virtual server may begin to receive the video data and/or the audio data that the first virtual server uses to generate the broadcasting data from the second user device. In some examples, the user may also begin to use the second user device to access the network application, such as by providing the inputs described herein.

In some examples, the system(s) may allow the user to use different user devices in order to provide inputs, such as commands, associated with the broadcasting session. For example, while the user is using a first user device to send input data to the second virtual server as well as sending video data and/or audio data to the first virtual server, the system(s) may also be receiving input data from a second user device of the user. The input data from the second user device may represent commands for the broadcasting session. As described herein, a command may include, but is not limited to, a command to pause the broadcasting, a command to stop the broadcasting, a command to turn on the camera, a command to turn off the camera, a command to turn on the microphone, a command to turn off the microphone, a command to change the position of the video overlay, and/or the like. As such, the system(s) may use the input data in order to execute the command from the second user device.

Additionally, in some examples, the system(s) may provide updates associated with the broadcasting session to each of the user devices that linked to the broadcasting session. For example, each time an update is made to the broadcasting session, such as turning the camera off or pausing the broadcasting session, the system(s) may send data representing the update to the user devices. This way, each user device is provided with the most updated information for the broadcasting session.

As described above, the system(s) may provide the network application to users via networks. For example, the system(s) may receive, from the user device, a request to access the network application. Based on the request, the system(s) may assign the user device to the second virtual server that is associated with the network application. The system(s) may then cause a launching of the network application on the second virtual server. For example, the system(s) may cause a launch file associated with the network application to execute on the second virtual server. Once the network application is launched, the system(s) (e.g., the second virtual server) may then send content data (e.g., video data, audio data, etc.) to and/or receive data (e.g., input data) from the user device while the user is accessing the network application.

For instance, the system(s) may send, to the user device, content data (e.g., video data, audio data, etc.) representing a first state of the network application. For example, if the network application includes a game, the first state of the network application may include an object (e.g., a character) located at a first position within a gaming environment (e.g., a forest). The user device may receive the content data from the system(s) and, using the content data, the user device may display image(s) representing the first state of the network application. For example, and again if the network application includes the network game, the user device may display content representing the object located at the first position within the gaming environment. In some instances, the user device may further output sound represented by the audio data. The user may then use the user device and/or a separate control device to provide inputs to the network application via the system(s).

For instance, the control device may receive an input, such as a selection of a button, joystick, key, touch-sensitive pad, sensor, and/or the like associated with the control device. The control device may then send, to the system(s), input data representing the input. Using the input data, the system(s) may update the first state of the network application to a second state of the network application using the second virtual server. For example, and again if the network application includes the game, the input may be associated with moving the object forward by a given amount within the gaming environment. As such, the system(s) may update the first state of the of the network application to the second state of the network application by moving the object forward in the environment by the given amount.

The system(s) may then send, to the user device, content data (e.g., video data, audio data, etc.) representing the second state of the application. Using the content data, the user device may display image(s) representing the second state of the game. For example, the user device may display content representing the object located at the second position within the gaming environment. Additionally, in some instances, the user device may output sound represented by the audio data. The system(s) may then continue to perform similar processes to update the state of the network application on the user device as the system(s) continues to receive input data from the control device. This way, the system(s) are able to provide the user with the network application without sending the actual data representing the network application to the user device for installation on the user device.

By performing the processes described herein, the user is able to broadcast a session associated with the network application without installing, executing, and/or configuring broadcasting software locally on the user device. Additionally, by launching the broadcasting session on a separate virtual server than the network application, the system(s) are able to provide the user with the broadcasting session before, during, and after the session associated with the network application. Furthermore, by launching the broadcasting session on the separate virtual server than the network application, the system(s) allow the user to switch between network applications without ending the broadcasting session. As such, if multiple other users are following the user during the broadcasting session, those users may continue to follow the user even when the user switches between network applications.

FIG. 1 illustrates an example environment 100 for sharing network applications, in accordance with examples of the present disclosure. In the example of FIG. 1, a provisioning component 102 may receive, from a user device 104 (and/or another component, device, etc.), a request to create a broadcasting session, with is represented by 106. In some examples, the request 106 includes a token that is sent to the provisioning component 102. Based on receiving the request 106, the provisioning component 102 may provision a broadcasting session 108 on a first virtual server 110. In some examples, provisioning the broadcasting session 108 may include installing software associated with the broadcasting session 108 on the first virtual server 110, launching the software, and then associating the user device 104 with the first virtual server 110. In some examples, such as when the software is already installed on the first virtual server 110, provisioning the broadcasting session 108 may include launching the software on the first virtual server 110 and then associating the user device 104 with the first virtual server 110. Still, in some examples, such as when the broadcasting session 108 is already launched on the first virtual server 110, provisioning the broadcasting session 108 may include associating the user device 104 with the first virtual server 110. In any of these examples, associating the user device 104 with the first virtual server 110 may include establishing a network connection between the user device 104 and the first virtual server 110.

The user device 104 may further cause an account link associated with the broadcasting session 108 to be created. For instance, the user device 104 may send, to a linking component 114, a request to create the account link, where the request is represented by 116. In some examples, the user device 104 sends the request via a client proxy that is connected to the user device 104 and the linking component 114. A page definition component 118 may further request and the receive a session status associated with broadcasting session 108, which is represented by 120. In some examples, the session status may indicate at least a type associated with the broadcasting session 108. The page definition component 118 may then send, to the linking component 114, account link information 122 associated with the account. The account link information 122 may include, but is not limited to, an identifier of the account, a name (e.g., username) associated with the account, a password associated with the account, and/or any other information. In some examples, although not illustrated in FIG. 1, the linking component 114 may further receive an account status and/or a token associated with linking the account.

The linking component 114 may then communicate with third-party system(s) 124 associated with the account, such as by using one or more API calls 126. The third-party system(s) 124 may host the third-party service associated with the account. For example, the third-party system(s) 124 may be associated with TWITCH® and/or any other third-party service that allows users to broadcast network applications. In some examples, the linking component 114 communicates with the third-party system(s) 124 in order to create the account link, such as by using the account link information 122. Additionally, in some examples, the linking component 114 receives, from the third-party system(s) 124, a token for accessing the third-party system(s) 124 and/or the account when broadcasting the network application.

In the example of FIG. 1, the provisioning component 102 may also receive, from the user device 104 (and/or another component, device, etc.), a request to create an application session, with is represented by 128. In some examples, the request 128 includes a token that is sent to the provisioning component 102. Additionally, or alternatively, in some examples, the request 128 includes at least an identifier of the network application, such as the network game, for which the user wants to create the session. Based on receiving the request 128, the provisioning component 102 may provision an application session 130 on a second virtual server 132, where the provisioning is represented by 134.

In some examples, provisioning the application session 130 may include installing the network application associated with the application session 130 on the second virtual server 132, launching the network application, and then associating the user device 104 with the second virtual server 132. In some examples, such as when the network application is already installed on the second virtual server 132, provisioning the application session 130 may include launching the network application on the second virtual server 132 and then associating the user device 104 with the second virtual server 132. Still, in some examples, such as when the application session 130 is already launched on the second virtual server 132, provisioning the application session 130 may include associating the user device 104 with the second virtual server 132. In any of these examples, associating the user device 104 with the second virtual server 132 may include establishing a network connection between the user device 104 and the second virtual server 132.

The second virtual server 132 may then use the network connection to communicate with the user device 104. For example, the second virtual server 132 may receive input data 136 from the user device 104. As described herein, the second virtual server 132 may then use the input data 136 to update states of the network application. After updating the states of the network application, the second virtual server 132 may generate and send, to the user device 104, content data 138 represent the states of the network application. As described herein, the content data 138 may include, but is not limited to, video data representing visual content (e.g., images, frames, etc.) depicting the states of the network application, audio content representing sound associated with the states of the network application, and/or any other type of content. The user device 104 may then use the content data 138 in order to provide the network application to the user.

As described herein, the first virtual server 110 may be configured to broadcast the network application for the user. As such, and as shown by the example of FIG. 1, the first virtual server 110 may establish a network connection with the second virtual server 132. The first virtual server 110 may then receive content data 140 from the second virtual server 132, where the content data 140 also represents the states of the network application. In some examples, the content data 140 is similar to the content data 138. The first virtual server 110 may also receive, from the user device 104, video data and/or audio data. As described herein, the video data 142 may be generated by a camera of the user device 104, where the video data 142 represents a video depicting the user. Additionally, the audio data 142 may be generated by a microphone of the user device 104, where the audio data 142 represents user speech from the user.

While the example of FIG. 1 illustrates the first virtual server 110 as receiving the video data 142 and the audio data 142 from the user device 104, in other example, the first virtual server 110 may receive the video data 142 and/or the audio data 142 from another user device. For instance, the other user device may also be associated with the local account of the user. As such, and as will be described in more detail below, the user may use both user devices when accessing the application session 130 and/or the broadcasting session 108.

The first virtual server 110 may then generate broadcasting data 144 representing broadcasting content (e.g., a broadcasting stream) for the network application. In some examples, and as discussed in more detail below, the first virtual server 110 may generate the broadcasting data 144 by at least overlaying the video represented by the video data 142 onto the visual content represented by the content data 140. The broadcasting data 144 may further represent the audio content represented by the content data 140 and/or the user speech represented by the audio data 142. Once the first virtual server 110 has generated the broadcasting data 144, the first virtual server 110 may send the broadcasting data 144 to a broadcasting component 146 for uploading the broadcasting data 144 to the third-party system(s) 124.

For example, the broadcasting component 146 may send the broadcasting data 144 to the third-party system(s) 124. In some examples, the broadcasting component 146 may use a streaming key when uploading the broadcasting data 144 to the third-party system(s) 124. For example, the streaming key, which may have been retrieved by the linking component 114 from the third-party system(s) 124, may allow for the broadcasting component 146 to upload the broadcasting data 144 to the linked account of the user.

As further illustrated in FIG. 1, a status component 148 may be configured to receive status data 150 from the first virtual server 110, where the status data 150 represents status changes associated with the broadcasting session 108. As described herein, a status change may include, but is not limited to, changing a device that is providing the video data 142, changing a device that is providing the audio data 142, turning on a camera providing the video data 142, turning off the camera providing the video data 142, turning on the microphone providing the audio data 142, turning off the microphone providing the audio data 142, turning on a chat feature, turning off the chat feature, changing the layout of the broadcasting content (e.g., changing the location of the overlay), starting the broadcasting session, 108, pausing the broadcasting session 108, terminating the broadcasting session 108, switching network applications, and/or any other type of status associated with the broadcasting session 108. The status component 148 may then provide the status data 150 to one or more other users devices 152 (although only one is illustrated for clarity reasons). This way, each user device that is connected to the broadcasting session 108 is able to receive the status updates.

Figure 2:
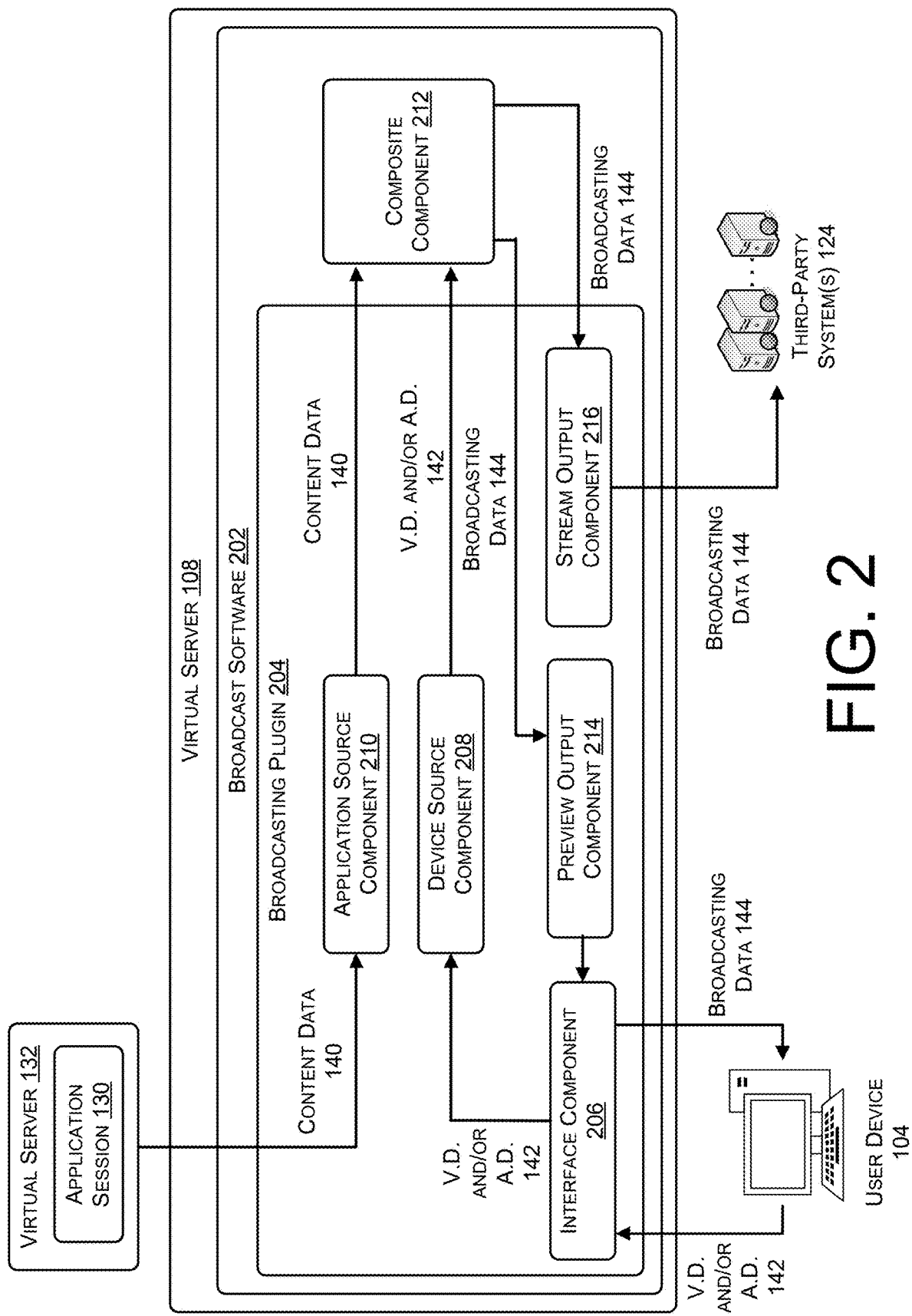
FIG. 2 illustrates an example of generating broadcasting data, in accordance with examples of the present disclosure.

FIG. 2 illustrates an example of generating the broadcasting data 144, in accordance with examples of the present disclosure. As shown, the first virtual server 110 may include broadcasting software 202 that the first virtual server 110 uses to generate the broadcasting data 144 for the broadcasting session 108. The broadcasting software 202 may include any type of software that uses data from multiple sources in order to generate data for streaming to the third-party system(s) 124. As shown, the broadcasting software 202 includes a broadcasting plugin 204 that the broadcasting software 202 uses to retrieve the data for generating the broadcasting data 144.

For example, the broadcasting plugin 204 may include an interface component 206 for communicating with the user device 104. As shown, the interface component 206 may receive at least the video data and/or audio data 142 from the user device 104. The interface component 206 may then send the video data and/or audio data 142 to a device source component 208. The broadcasting plugin 204 further includes an application source component 210 for communicating with the second virtual server 132. For example, the application source component 210 may communicate with the second virtual server 132 in order to receive the content data 140.

The device source component 208 then sends the video data and/or audio data 142 to a composite component 212 while the application source component 210 sends the content data 140 to the composite component 212. The composite component 212 may then use the video data 142, the audio data 142, and/or the content data 140 to generate the broadcasting data 144. For example, and as described herein, the composite component 212 may generate the broadcasting data 144 by at least overlaying the video represented by the video data 142 over a portion of visual content represented by the content data 140. In some examples, the composite component 212 uses the initial configurations from the user device 104 in order to perform the overlay. For example, the initial configurations may indicate the position for placing the overlay over the visual content.

The composite component 212 may then provide the broadcasting data 144 to a preview output component 214, which then sends the broadcasting data 144 to the interface component 206 for output to the user device 104. This way, the user device 104 is able to display the broadcasting content represented by the broadcasting data 144 to the user. The composite component 212 may further provide the broadcasting data 144 to a stream output component 216, which then provides the broadcasting data 144 to the third-party system(s) 124 for output. In other words, the first virtual server 110 is able to provide the broadcasting data 144 to the user for preview before providing the broadcasting data 144 to the third-party system(s) 124 for output to other users.

While the example of FIG. 2 illustrates only a single user device 104 as communicating with the first virtual server 110 via the interface component 206, in other examples, multiple user devices may be communicating with the first virtual server 110 via the interface component 206. For example, the user device 152, from FIG. 1, may also be receiving the broadcasting data 144 from the first virtual server 110 via the interface component 206. The user device 104 and/or the user device 152 may also be providing configuration data associated with the broadcasting session 108 to the first virtual server 110 via the interface component 206 (and/or another component). The configuration data is described in more detail below.

Figure 3:
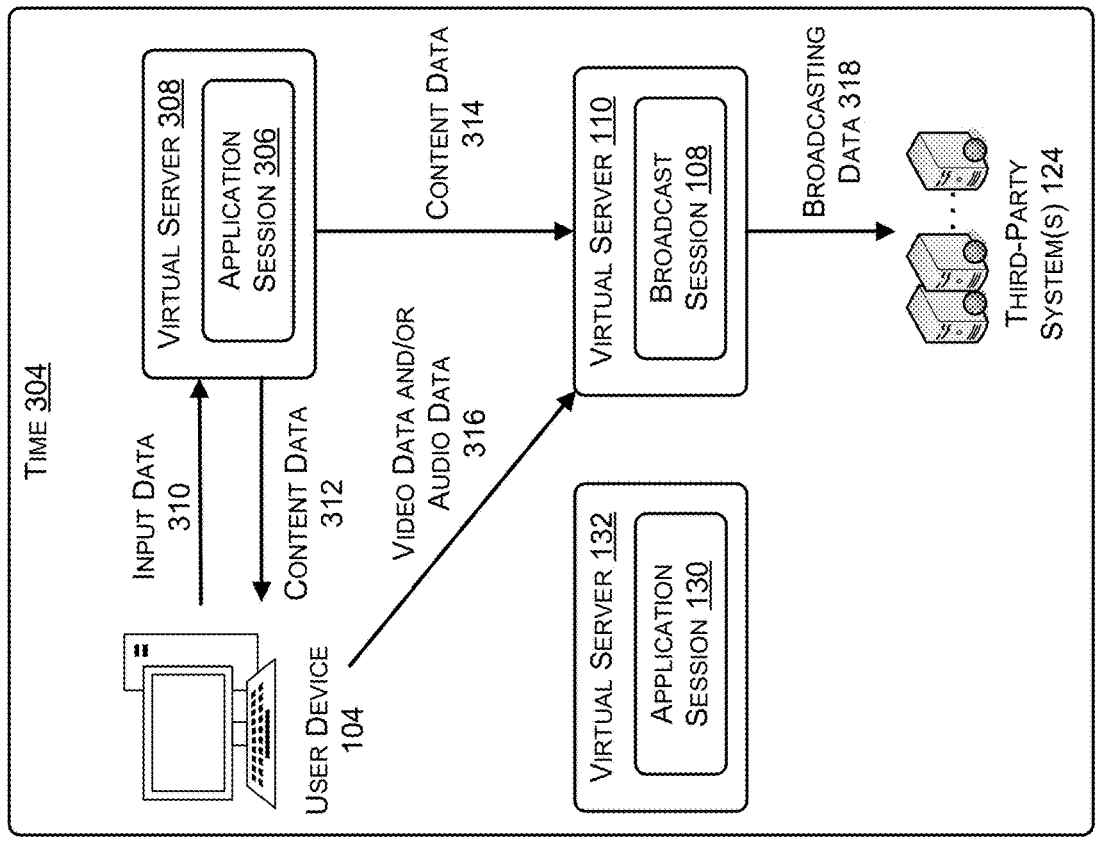
FIG. 3 illustrates an example of switching network applications during a broadcasting session, in accordance with examples of the present disclosure.
Figure 3:
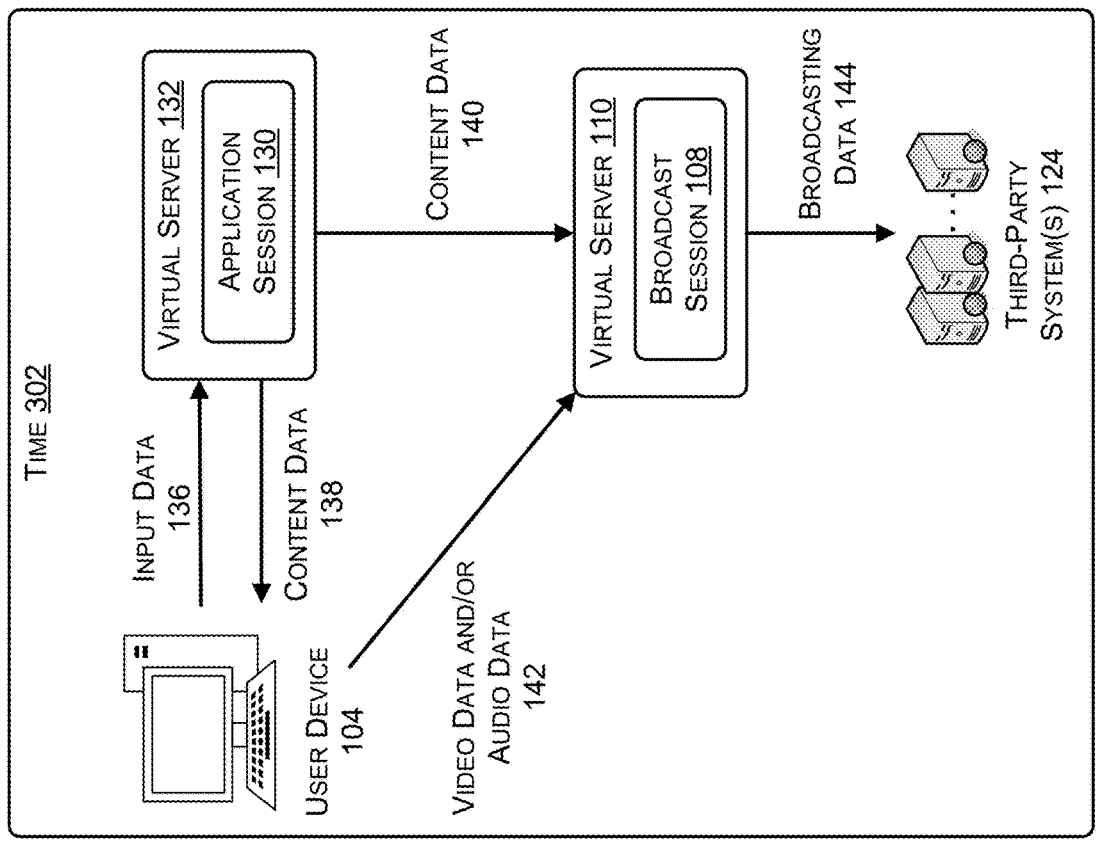

As described herein, in some examples, the first virtual server 110 may switch between network applications during the broadcasting session 108. As such, FIG. 3 illustrates an example of switching network applications during the broadcasting session 108, in accordance with examples of the present disclosure. As shown, at a first time 302, the first virtual server 110 may receive the video data and/or the audio data 142 from the user device 104. Additionally, the first virtual server 110 may receive the content data 140 from the second virtual server 132. The first virtual server 110 may then use the video data 142, the audio data 142, and/or the content data 140 to generate the broadcasting data 144 for output to the third-party system(s) 124. This process is similar to the example described with respect to FIG. 1.

However, at a second time 304, the user may switch to accessing a new network application. For example, the provisioning component 102 may receive, from the user device 104 (and/or another component, device, etc.), a request to create an application session for the new application. Based on receiving the request, the provisioning component 102 may provision an application session 306 on a third virtual server 308. In some examples, provisioning the application session 306 may include installing the new network application associated with the application session 306 on the third virtual server 308, launching the new network application, and then associating the user device 104 with the third virtual server 308. In some examples, such as when the new network application is already installed on the third virtual server 308, provisioning the application session 306 may include launching the new network application on the third virtual server 308 and then associating the user device 104 with the third virtual server 308. Still, in some examples, such as when the application session 306 is already launched on the third virtual server 308, provisioning the application session 306 may include associating the user device 104 with the third virtual server 308. In any of these examples, associating the user device 104 with the third virtual server 308 may include establishing a network connection between the user device 104 and the third virtual server 308.

The third virtual server 308 may then use the network connection to communicate with the user device 104. For example, the third virtual server 308 may receive input data 310 from the user device 104. As described herein, the third virtual server 308 may then use the input data 310 to update states of the new network application. After updating the states of the new network application, the third virtual server 308 may generate and send, to the user device 104, content data 312 representing the states of the new network application. As described herein, the content data 312 may include, but is not limited to, video data representing visual content (e.g., images, frames, etc.) depicting the states of the new network application, audio content representing sound associated with the states of the new network application, and/or any other type of content. The user device 104 may then use the content data 138 in order to provide the new network application to a user.

As further illustrated in the example of FIG. 3, the first virtual server 110 may establish a network connection with the third virtual server 308. In some examples, either before, during, and/or after establishing the network connection with the third virtual server 308, the first virtual server 110 may terminate the network connection with the second virtual server 132. The first virtual server 110 may then receive content data 314 from the third virtual server 308, where the content data 314 also represents the states of the new network application. In some examples, the content data 314 is similar to the content data 312. The first virtual server 110 may also receive, from the user device 104, video data and/or audio data 316. As described herein, the video data 316 may be generated by a camera of the user device 104, where the video data 316 represents a video depicting the user. Additionally, the audio data 316 may be generated by a microphone of the user device 104, where the audio data 316 represents user speech from the user.

The first virtual server 110 may then generate broadcasting data 318 representing broadcasting content (e.g., a broadcasting stream) for the new network application. In some examples, and as discussed in more detail herein, the first virtual server 110 may generate the broadcasting data 318 by at least overlaying the video represented by the video data 316 onto the visual content represented by the content data 314. The broadcasting data 318 may further represent the audio content represented by the content data 314 and/or the user represented by the audio data 316. Once the first virtual server 110 has generated the broadcasting data 318, the first virtual server 110 may send the broadcasting data 318 to the third-party system(s) 124.

In the example of FIG. 3, the first virtual server 110 may store a session-tracking component 320 that is configured to automatically determine when the user switches between network applications, such as between the network application executing on the second virtual server 132 and the new network application executing on the third virtual server 308. The session-tracking component 320 may make the determination using one or more processes. For a first example, the session-tracking component 320 may make the determination based on the first virtual server 110 terminating the network connection with the second virtual server 132 and/or establishing the network connection with the third virtual server 308. For a second example, the session-tracking component 320 may make the determination based on receiving data indicating the switching between the network applications, such as from the provisioning component 102. Still, for a third example, the session-tracking component 320 may make the determination based on the first virtual server 110 beginning to receive the content data 314 that is associated with the new network application. For instance, the session-tracking component 320 may determine that the first virtual server 110 switched from receiving the content data 140 associated with the initial network application to receiving the content data 314 associated with the new network application. While these are just a couple of example processes of how the session-tracking component 320 may determine that the user has switched network applications, in other examples, the session-tracking component 320 may use additional and/or alternative processes.

Based on detecting the switching of the network applications, the session-tracking session 320 may then cause the first virtual server 110 to begin generating the broadcasting data 318 using the content data 314. Additionally, the session-tracking component 320 may cause the first virtual server 110 to send status data 150 indicating the changing of the network applications. This way, other user device(s), such as the user device 152, are able to track the change in then network application.

While the example of FIG. 3 illustrates the session-tracking component 320 as being stored on the first virtual server 110, in other examples, the session-tracking component 320 may be external to the first virtual server 110.

Figure 4:
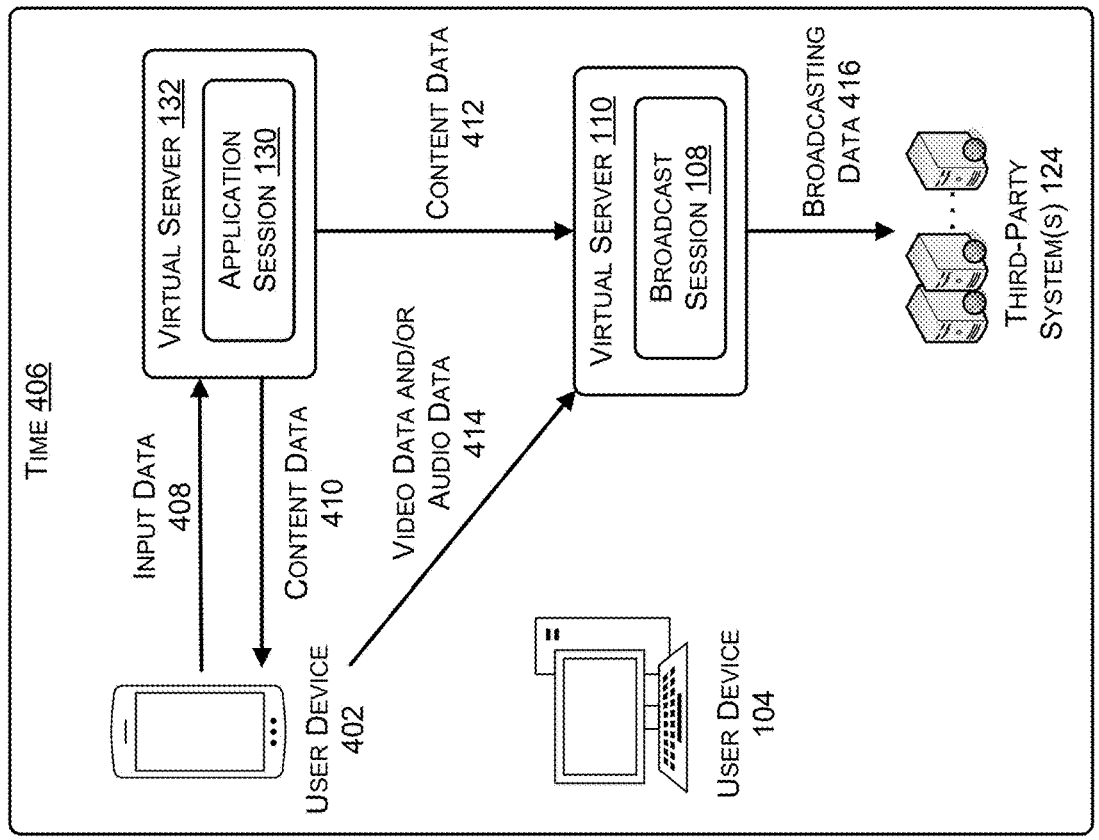
FIG. 4 illustrates a first example of switching between user devices during a broadcasting session, in accordance with examples of the present disclosure.
Figure 4:
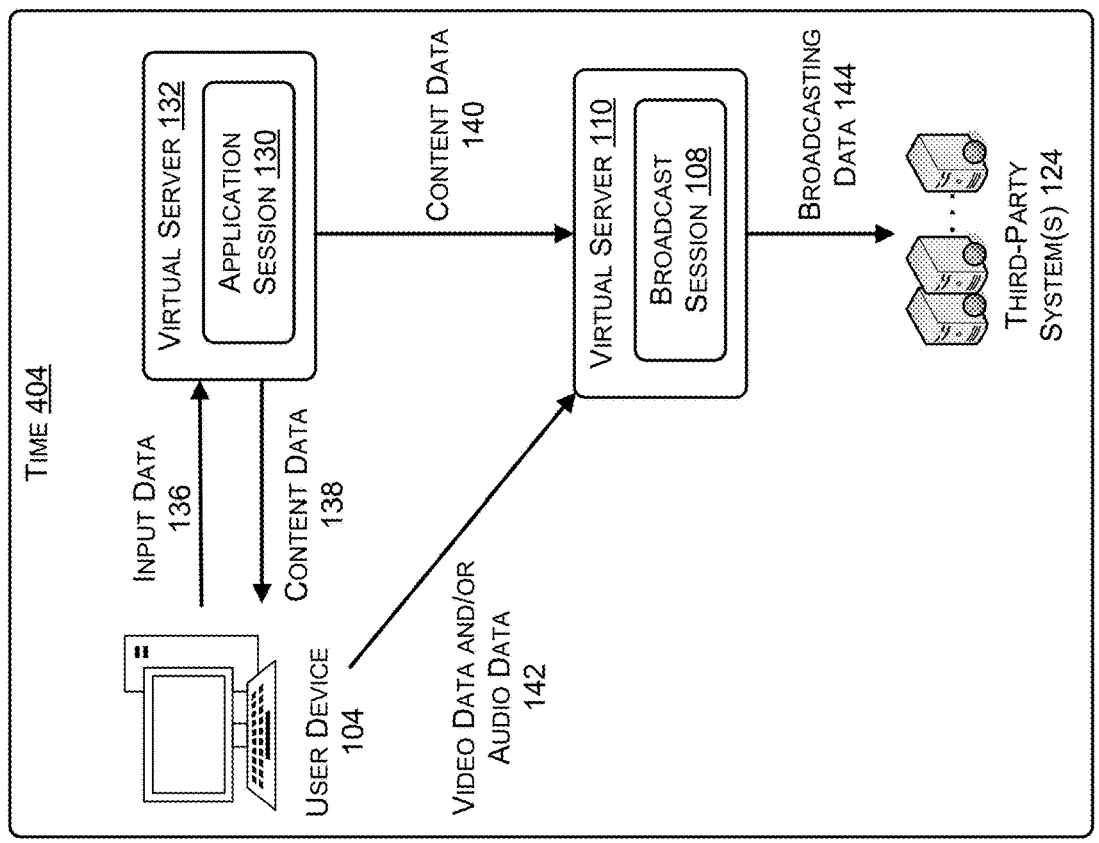

As described herein, in some examples, the user may switch between user devices during the broadcasting session 108. As such, FIG. 4 illustrates a first example of switching from the user device 104 to a new user device 402 during the broadcasting session 108, in accordance with examples of the present disclosure. As shown, at a first time 404, the first virtual server 110 may receive the video data and/or the audio data 142 from the user device 104. Additionally, at the first time 404, the first virtual server 110 may receive the content data 140 from the second virtual server 132. The first virtual server 110 may then use the video data 142, the audio data 142, and/or the content data 140 to generate the broadcasting data 144 for output to the third-party system(s) 124. This process is similar to the example described with respect to FIG. 1.

However, at a second time 406, the user may switch to using the user device 402. In some examples, to switch the user device 402, the provisioning component 102 may receive, from the user device 402 and/or the user device 104 (and/or another component, device, etc.), an indication to begin using the user device 402 for controlling the network application. Based on receiving the request, the provisioning component 102 may establish a network connection between the user device 402 and the second virtual server 132 (e.g., if there is not already a network connection between the user device 402 and the second virtual server 132). In some examples, the provisioning component 102 may further terminate the network connection between the user device 104 and the second virtual server 132.

The second virtual server 132 may then use the network connection to communicate with the user device 402. For example, the second virtual server 132 may receive input data 408 from the user device 402. As described herein, the second virtual server 132 may then use the input data 408 to update states of the network application. After updating the states of the network application, the second virtual server 132 may generate and send, to the user device 402, content data 410 representing the states of the network application. As described herein, the content data 410 may include, but is not limited to, video data representing visual content (e.g., images, frames, etc.) depicting the states of the network application, audio content representing sound associated with the states of the network application, and/or any other type of content. The user device 402 may then use the content data 410 in order to provide the network application to a user.

As further illustrated in the example of FIG. 4, the first virtual server 110 may continue to use the network connection with the second virtual server 132 in order to receive content data 412 from the second virtual server 132, where the content data 412 also represents the states of the network application. In some examples, the content data 412 is similar to the content data 410. The first virtual server 110 may also receive, from the user device 402, video data and/or audio data 414. As described herein, the video data 414 may be generated by a camera of the user device 402, where the video 414 represents a video depicting the user. Additionally, the audio data 414 may be generated by a microphone of the user device 402, where the audio data 414 represents user speech from the user.

The first virtual server 110 may then generate broadcasting data 416 representing broadcasting content (e.g., a broadcasting stream) for the network application. In some examples, and as discussed in more detail herein, the first virtual server 110 may generate the broadcasting data 416 by at least overlaying the video represented by the video data 414 onto the visual content represented by the content data 412. The broadcasting data 416 may further represent the audio content represented by the content data 412 and/or the user speech represented by the audio data 414. Once the first virtual server 110 has generated the broadcasting data 416, the first virtual server 110 may send the broadcasting data 416 to the third-party system(s) 124.

It should be noted that, in some examples, the user may use both the user device 104 and the user device 402 to provide input, such as commands, associated with the broadcasting session 108. For example, at the first time 404, while the user is using the user device 104 to send the input data 136 to the second virtual server 132 while also sending the video data and/or the audio data 142 to the first virtual server 110, the system(s) may also be receiving input data from the user device 402. The input data from the user device 402 may represent commands for the broadcasting session 108. As described herein, a command may include, but is not limited to, a command to pause the broadcasting session 108, a command to stop the broadcasting session 108, a command to turn on the camera, a command to turn off the camera, a command to turn on the microphone, a command to turn off the microphone, a command to change the position of the video overlay, and/or the like. As such, the system(s) may use the input data in order to execute the command. Updates about the command may then be sent to both the user device 104 and the user device 402.

Figure 5:
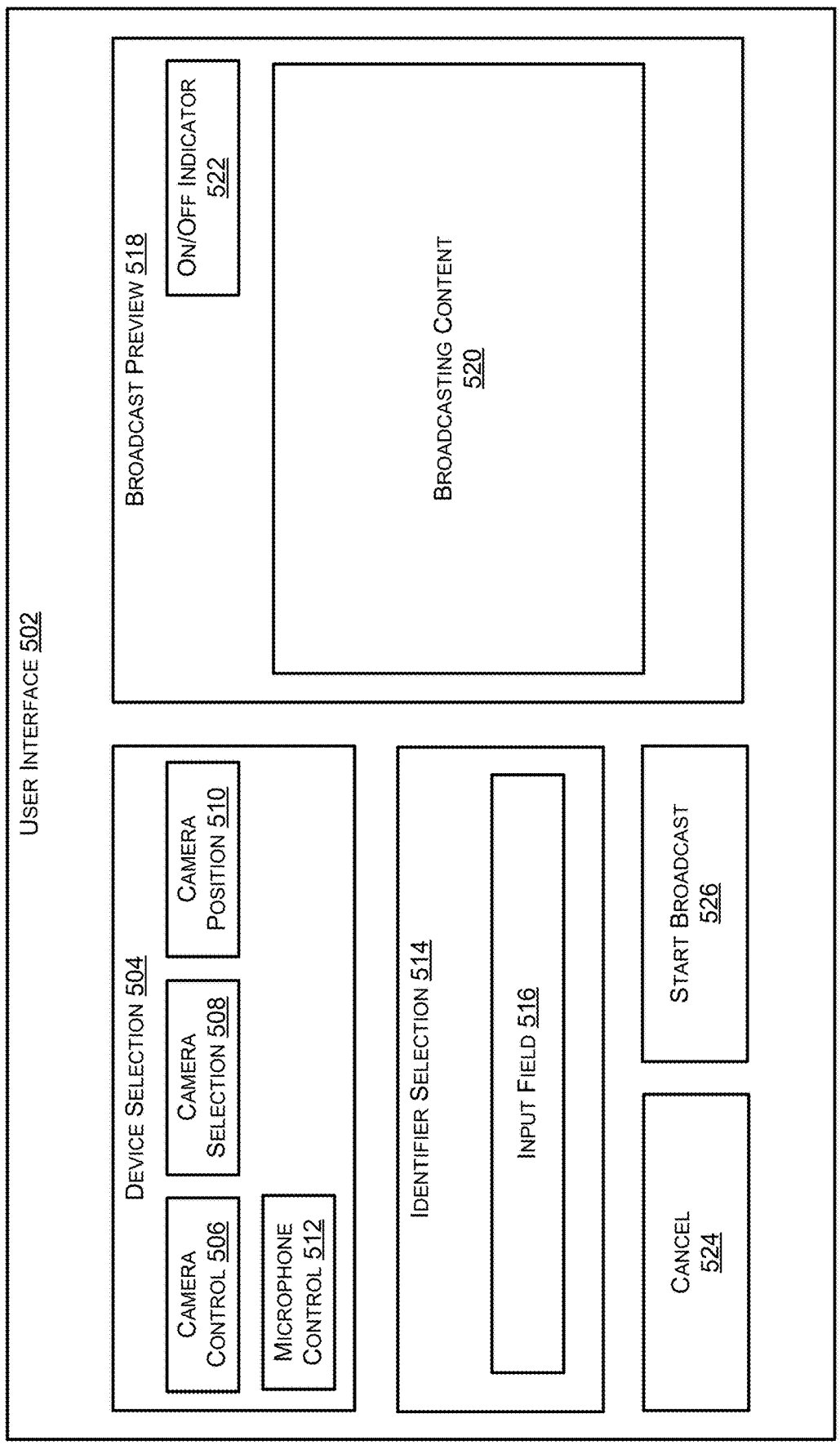
FIG. 5 illustrates an example user interface for configuring a broadcasting session, in accordance with examples of the present disclosure.

As described herein, the user may use a user interface to configure the broadcasting session 108. As such, FIG. 5 illustrates an example user interface 502 for configuring the broadcasting session 108, in accordance with examples of the present disclosure. As shown, a first portion of the user interface 502 may be associated with a device selection 504 for the broadcasting session 108. For example, the device selection 504 portion of the user interface 502 may include a first interface element 506 associated with controlling the camera, a second interface element 508 for selecting the camera, a third interface element 510 for selecting a position for the video captured by the camera, and a fourth interface element 512 for controlling the microphone. As described herein, an interface element may include, but is not limited to, a button, a toggle, a checkbox, a slider, a dropdown list, a list, an input field, and/or any other type of interactive element of a user interface.

For instance, the user may use the first interface element 506 to turn the camera on or turn the camera off. The user may also use the second interface element 508 for selecting which camera to use when generating the video data representing the user. For instance, and as described herein, the user may associate multiple devices with the local account. As such, the user may be able to select a camera associated with one of the devices to generate the video data. The user may then use the third interface element 510 to select where to position the video with respect to the broadcasting content. For example, the user may use the third interface element 510 to position the video in the top-right corner, the top-left corner, the bottom-right corner, the bottom-left corner, and/or any other position. Finally, the user may use the fourth interface element 512 to turn the microphone on or turn the microphone off.

A second portion of the user interface 502 may be associated with an identifier selection 514 for the broadcasting session 1110. For example, the identifier selection 514 portion of the user interface 502 may include a fifth interface element 516 for inputting an identifier (e.g., a name, a username, a title, etc.) that will be used for the broadcasting session 108. While the example of FIG. 5 illustrates the fifth interface element 516 as including an input field, in other examples, the fifth interface element 516 may include any other type of interface element (e.g., a dropdown list).

A third portion of the user interface 502 may be associated with a broadcast preview 518 for the broadcasting session 108. For example, the broadcast preview 518 may include broadcasting content 520 that is similar to the broadcasting content that will be shared to other users during the broadcasting session 108. In some examples, the broadcasting content 520 includes the visual content represented by the content data from the network application, wherein the video captured by the camera is overlayed over the visual content. In some examples, the video is overlayed over the visual content according to the camera position selected using the third interface element 510. As further shown, the broadcast preview 518 includes an on/off indicator 522 associated with the broadcasting session 108. For instance, the on/off indicator may indicate whether the broadcasting session 108 is not being broadcast or is currently being broadcast to the other users.

The user interface 502 may further include one or more interface elements 524 associated with controlling chatting associated with the broadcasting session 108. For example, a sixth interface element 524 may be associated with showing or hiding a chat box that the user uses to chat with other users connected to the broadcasting session 108. A seventh interface element 524 may be associated with opening the chat box in a separate user interface. This way, the user is able to continue to stay in contact with the other users, such as when the user is accessing the network application.

The user interface 502 further includes an eighth interface element 526 for canceling the setting up of the broadcasting session 108 and a ninth interface element 528 for starting the broadcasting of the broadcasting session 108. For example, if the user selects the eighth interface element 526, then the broadcasting session 108 may be terminated. However, if the user selects the ninth interface element 528, then the broadcasting session 108 may begin broadcasting to the other users.

The user interface 502 further includes an eleventh interface element 540 for pausing the broadcasting session 108 and a twelfth interface element 542 for starting the broadcasting of the broadcasting session 108. For example, if the user selects the eleventh interface element 540, then the broadcasting session 108 may be paused. However, if the user selects the twelfth interface element 542, then the broadcasting session 108 may be stopped such that the broadcasting session 108 is no longer being broadcast to other users.

Figure 6:
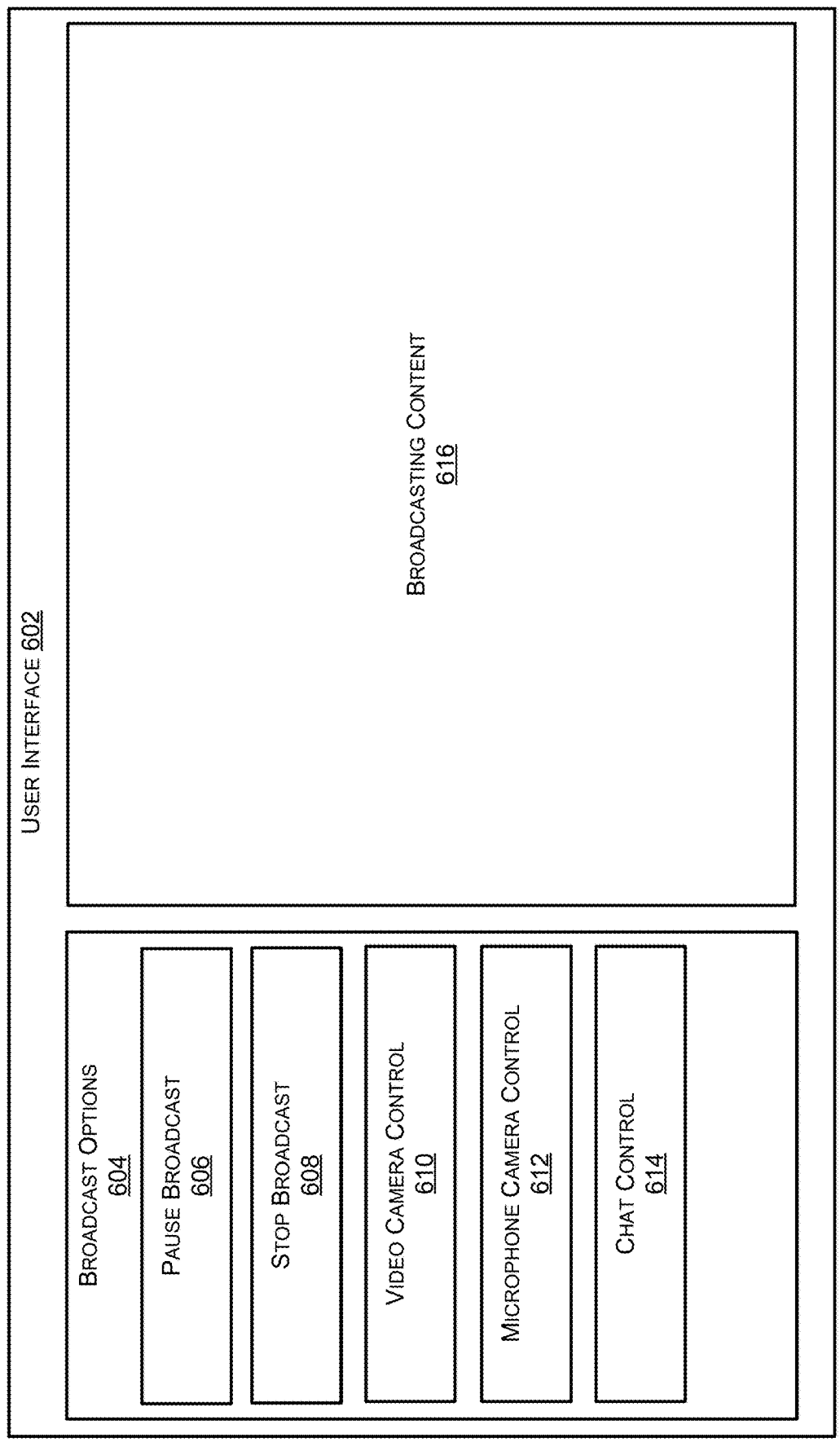
FIG. 6 illustrates an example user interface for controlling a broadcasting session, in accordance with examples of the present disclosure.

During the broadcasting session 108, the user may also be able to control various functions of the broadcasting session 108. For instance, FIG. 6 illustrates an example user interface 602 for controlling the broadcasting session 108, in accordance with examples of the present disclosure. As shown, a first portion of the user interface 602 may be associated with broadcast options 604 for the broadcasting session 108. For instance, the broadcast options 604 may include a first interface element 606 for pausing the broadcasting session 108, a second interface element 608 for stopping the broadcasting session 108, a third interface element 610 for controlling the camera, a fourth interface element 612 for controlling the microphone, and a fifth interface element 614 for controlling the chat.

For instance, the user may use the first interface element 606 to pause the broadcasting session 108. By pausing the broadcasting session 108, the broadcasting session 108 will continue to execute on the first virtual server 110, but will be paused for the other uses. This way, the user is able to again start the broadcasting session 108 without ending the broadcasting session 108 for the other users. However, if the user wants to end the broadcasting session 108, the user is able to use the second interface element 608 to stop the broadcasting session 108. Stopping the broadcasting session 108 will cause the broadcasting session 108 to no longer execute on the first virtual server 110. Additionally, the broadcasting content will no longer be provided to the other users.

The user may also use the third interface element 610 to turn the camera on or off during the broadcasting session 108. Similarly, the user may use the fourth interface element 612 to turn the microphone on or off and the fifth interface element 614 to turn the chat features on or off during the broadcasting session 108. In other words, the user interface 602 provides options for the user to control the broadcasting session 108 while the broadcasting session 108 active.

The user interface 602 may further includes broadcasting content 616 that is also being provided to the other users. This way, the user is able to view the broadcasting content 616 in order to determine whether to change one or more configurations associated with the broadcasting. In some examples, the user interface 602 may be provided to each of the user devices that are connected to the local account of the user. This way, the user is able to control the broadcasting of the network application using more than one user device.

Figure 7:
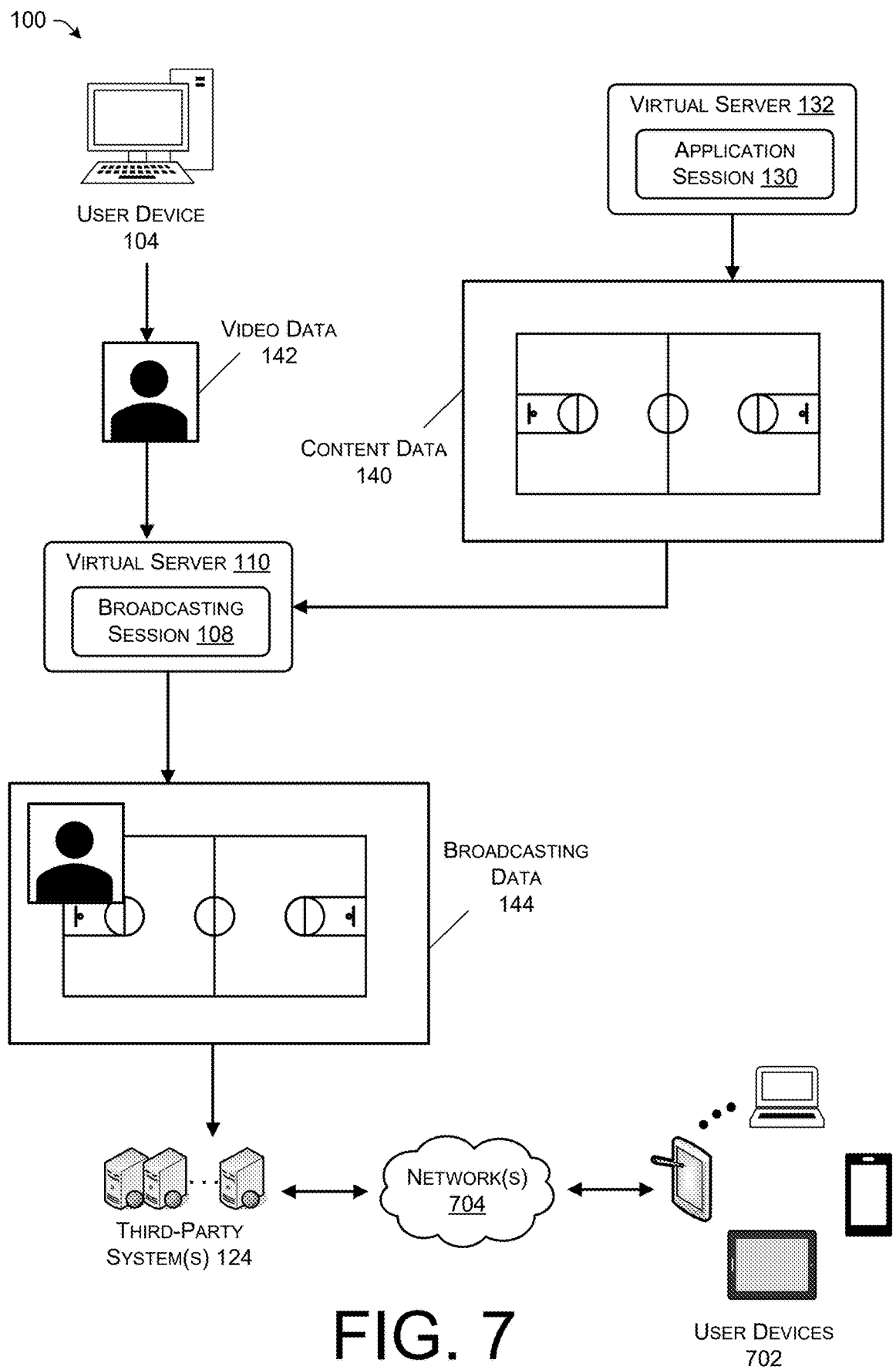
FIG. 7 illustrates an example environment for broadcasting a network application to other users, in accordance with examples of the present disclosure.

FIG. 7 illustrates an example environment 700 for broadcasting a network application to other users, in accordance with examples of the present disclosure. As shown, the user device 104 may send the video data 142 (and/or the audio data 142) to the first virtual server 110. In the example of FIG. 7, the video data 142 represents a video depicting the user of the user device 104. For example, the video data 142 may be generated by a camera (e.g., a webcam) of the user device 104. The second virtual server 132 may also be sending the content data 140 associated with the application session 130 to the first virtual server 110. In the example of FIG. 7, the content data 140 represents visual content depicting a game that is being played by the user via the user device 104. For instance, and as described herein, the second virtual server 132 may be sending the same content data 140 to the user device 104.

The first virtual server 110 may then use the video data 142 and the content data 140 in order to generate the broadcasting data 144 associated with the broadcasting session 108. For instance, and in the example of FIG. 7, the first virtual server 110 may generate the broadcasting data 144 by overlaying the video represented by the video data 142 over a portion of the visual content represented by the content data 140. The first virtual server 110 may then send the broadcasting data 144 to the third-party system(s) 124 for broadcasting to other users. For example, the third-party system(s) 124 may post the broadcasting content represented by the broadcasting data 144 such that other users are able to access the broadcasting content using user devices 702 via network(s) 704.

While the example of FIG. 7 illustrates the video being overlayed at a top-left corner over the visual content, in other examples, the video may be overlayed at a different position over the visual content. For example, the video may be overlayed at a top-right corner, a bottom-right corner, a bottom-left corner, and/or the like. In some examples, the first virtual server 110 uses the configuration data in order to determine the position for overlaying the video. In some examples, the user is able to update the configuration data, during the broadcasting session 108, in order to change the position of the video on the visual content.

FIGS. 8A-10B illustrate various processes for sharing network applications. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed.

Figure 8A:
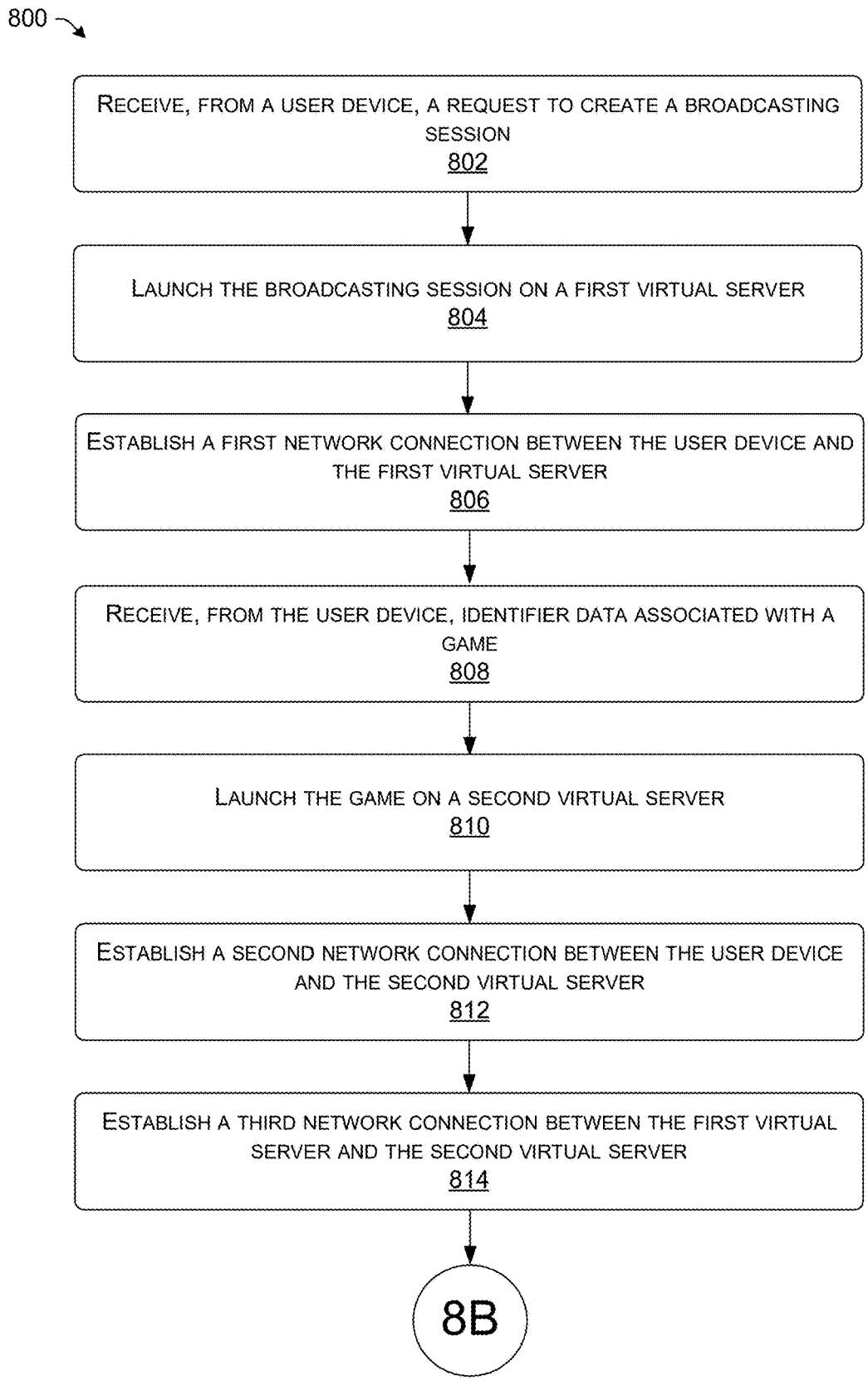
FIGS. 8A-8B illustrate an example process for broadcasting a game, in accordance with examples of the present disclosure.
Figure 8B:
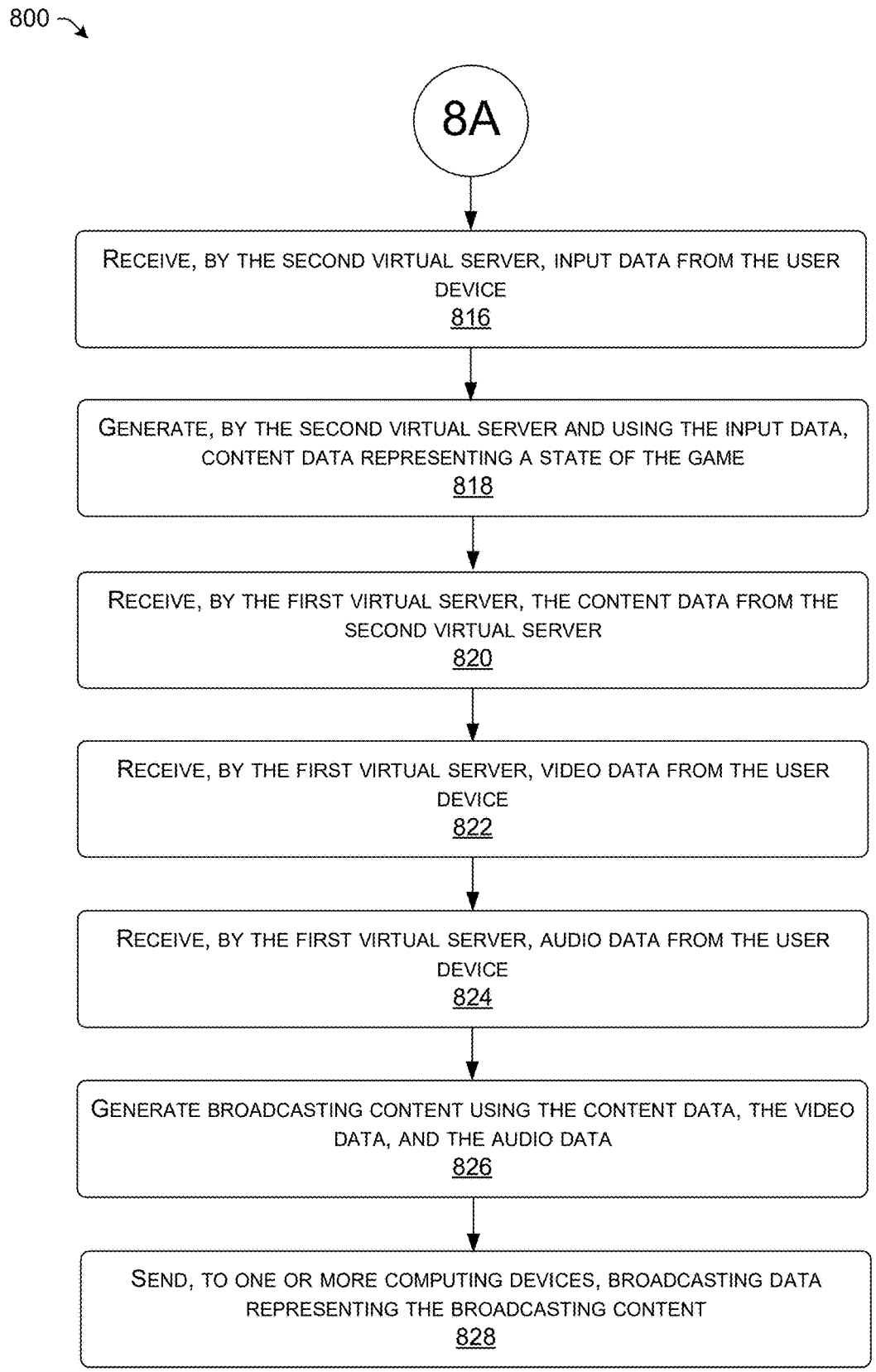

FIGS. 8A-8B illustrate an example process 800 for broadcasting a game, in accordance with examples of the present disclosure. At 802, the process 800 may include receiving, from a user device, a request to create a broadcasting session and at 804, the process 800 may include launching the broadcasting session on a first virtual server. For instance, system(s) (e.g., the provisioning component 102) may receive the request from the user device 104. Based on receiving the request, the system(s) may launch the broadcasting session on the first virtual server 110. After launching the broadcasting session, and at 806, the process 800 may include establishing a first network connection between the user device and the first virtual server. For instance, the system(s) may then establish the first network connection between the first virtual server 110 and the user device 104.

At 808, the process 800 may include receiving, from the user device, identifier data associated with a game and at 810, the process 800 may include launching the game on a second virtual server. For instance, system(s) (e.g., the provisioning component 102) may receive the identifier data from the user device 104. Based on receiving the identifier data, the system(s) may launch the game on the second virtual server 132. After launching the game, and at 812, the process 800 may include establishing a second network connection between the user device and the second virtual server. For instance, the system(s) may then establish the second network connection between the second virtual server 132 and the user device 104.

At 814, the process 800 may include establishing a third network connection between the first virtual server and the second virtual server. For instance, the system(s) (e.g., the provisioning component 102) may also establish the third network connection between the first virtual server 110 and the second virtual server 132. This way, the first virtual server 110 is able to receive, from the second virtual server 132, the data needed for generating and providing the broadcasting content.

At 816, the process 800 may include receiving, by the second virtual server, input data from the user device and at 818, the process 800 may include generating, by the second virtual server and using the input data, content data representing a state of the game. For instance, the second virtual server 132 may begin to receive the input data from the user device 104. The input data may represent an input, such as a selection of a button, joystick, key, touch-sensitive pad, sensor, and/or the like associated with the user device 104. The second virtual server 132 may then use the input data to generate the content data representing the state of the game. For instance, the second virtual server 132 may update the position of one or more objects of the game, such as a character, based on the input data. The second virtual server 132 may then send the content data to the user device 104 so that the user device 104 is able to output content represented by the content data.

At 818, the process 800 may include receiving, by the first virtual server, the content data from the second virtual server. For instance, while the second virtual server 132 is sending the content data to the user device 104, the second virtual server 132 may also be sending the content data to the first virtual server 110. In some examples, the second virtual server 132 sends the same content data to both the first virtual server 110 and the user device 104. In other examples, the second virtual server 132 may send, to the first virtual server 110, content data that differs from the content data that the second virtual server 132 sends to the first virtual server 110.

At 822, the process 800 may include receiving, by the first virtual server, video data from the user device and at 824, the process 800 may include receiving, by the first virtual server, audio data from the user device. For instance, the first virtual server 110 may receive the video data and the audio data from the user device 104. As described herein, the video data may represent a video depicting the user playing the game. Additionally, the audio data may represent user speech from the user as the user is playing the game. In some examples, the first virtual server 110 receives the video data and the audio data based on the user turning on the camera and the microphone, respectively.

At 826, the process 800 may include generating broadcasting content using the content data, the video data, and the audio data. For instance, the first virtual server 110 may generate the broadcasting content using the content data, the video data, and the audio data. For instance, the broadcasting content may include the video represented by the video data overlayed over a portion of the visual content represented by the content data. The broadcasting content may further include the sound represented by the audio data and the audio content represented by the content data. In some examples, the first virtual server 110 generates the broadcasting content using configuration data. For examples, the configuration data may indicate the position of where the video is to be overlayed over the visual content.

At 828, the process 800 may include sending, to one or more computing devices, broadcasting data representing the broadcasting content. For instance, the system(s) (e.g., the first virtual server 110) may send the broadcasting data to the one or more computing devices. As described herein, the one or more computing devices may be associated with a third-party service that posts the broadcasting content such that other users are able to view the broadcasting content.

Figure 9:
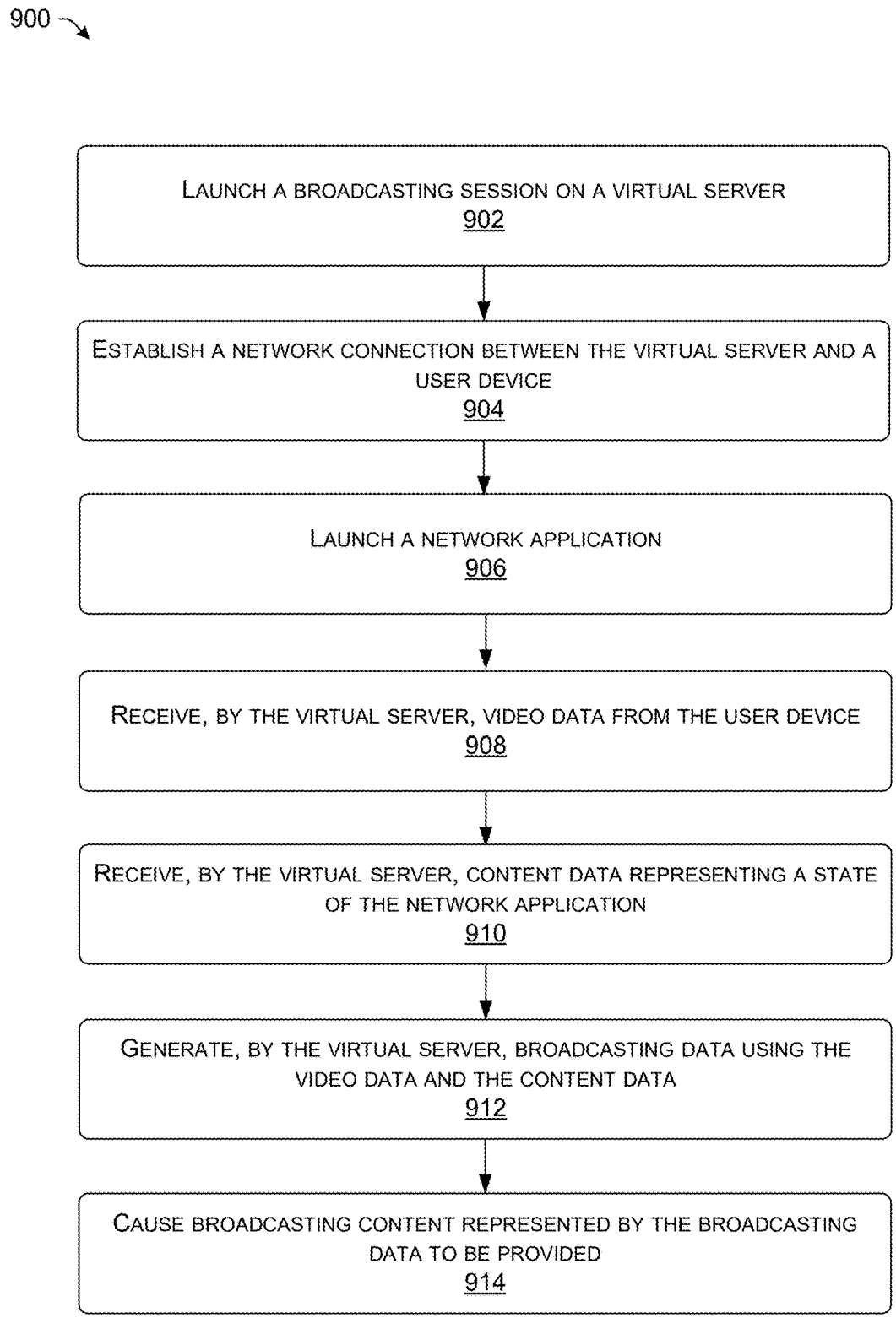
FIG. 9 illustrates an example process for broadcasting a network application, in accordance with examples of the present disclosure.

FIG. 9 illustrates an example process for broadcasting a network application, in accordance with examples of the present disclosure. At 902, the process 900 may include launching a broadcasting session on a virtual server and at 904, the process 900 may include establishing a network connection between the virtual server and a user device. For instance, system(s) (e.g., the provisioning component 102) may launch the broadcasting session on the first virtual server 110. In some examples, the system(s) launch the broadcasting session based on receiving, from the user device 104, a request to launch the broadcasting session. The system(s) may then establish the network connection between the first virtual server 110 and the user device 104. This way, the first virtual server 110 is able to receive data from the user device 104.

At 906, the process 900 may include launching a network application. For instance, the system(s) (e.g., the provisioning component 102) may launch the network application, such as a gaming application. In some examples, the system(s) launch the network application on the first virtual server 110. In other examples, the system(s) launch the network application on the second virtual server 132. In such examples, the system(s) may then establish a network connection between the first virtual server 110 and the second virtual server 132 and/or the second virtual server 132 and the user device 104.

At 908, the process 900 may include receiving, by the virtual server, video data from the user device and at 910, the process 900 may include receiving, by the virtual server, content data representing a state of the network application. For instance, the first virtual server 110 may receive the video data from the user device 104. The first virtual server 110 may also receive the content data representing the state of the network application. In examples where the network application is launched on the second virtual server 132, the first virtual server 110 receives the content data from the second virtual server 132. As described herein, the content data may include the same content data that is sent to the user device 104 while the user is accessing the network application.

At 912, the process 900 may include generating, by the virtual server, broadcasting data using the video data and the content data. For instance, the first virtual server 110 may generate the broadcasting data using the video data and the content data. For example, the broadcasting data may represent a video represented by the video data overlayed over a portion of the visual content represented by the content data. The broadcasting data may further include the audio content represented by the content data. Additionally, in examples where the first virtual server 110 also receives audio data from the user device 104, the broadcasting data may include at least a portion of the audio data. In some examples, the first virtual server 110 generates the broadcasting data using configuration data. For examples, the configuration data may indicate the position of where the video is to be overlayed over the visual content.

At 914, the process 900 may include sending the broadcasting data to one or more computing devices. For instance, the system(s) (e.g., the first virtual server 110) may send the broadcasting data to the one or more computing devices. As described herein, the one or more computing devices may be associated with a third-party service that posts the broadcasting content such that other users are able to view the broadcasting content.

Figure 10A:
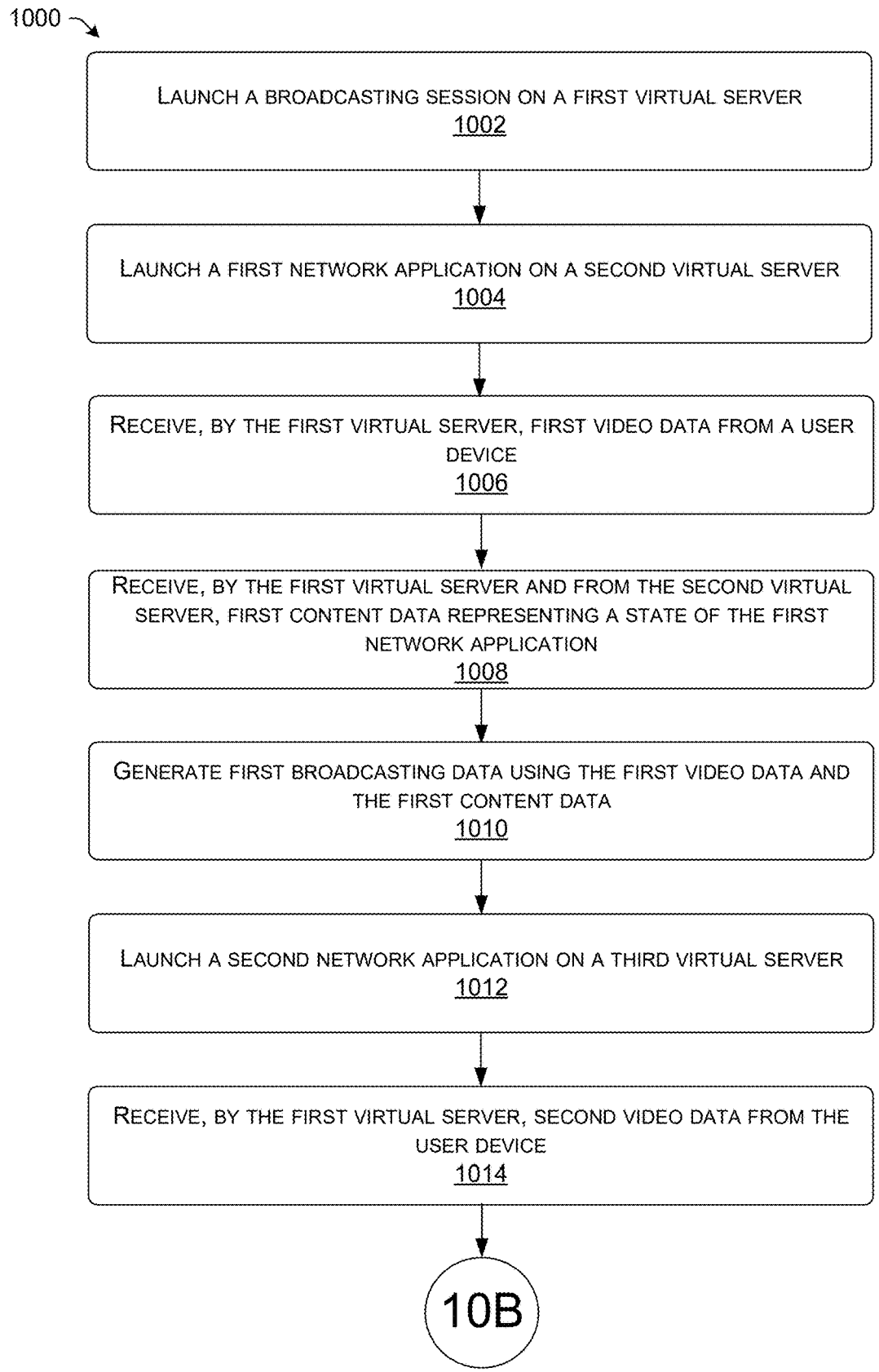
FIGS. 10A-10B illustrate an example process for broadcasting a game, in accordance with examples of the present disclosure.
Figure 10B:
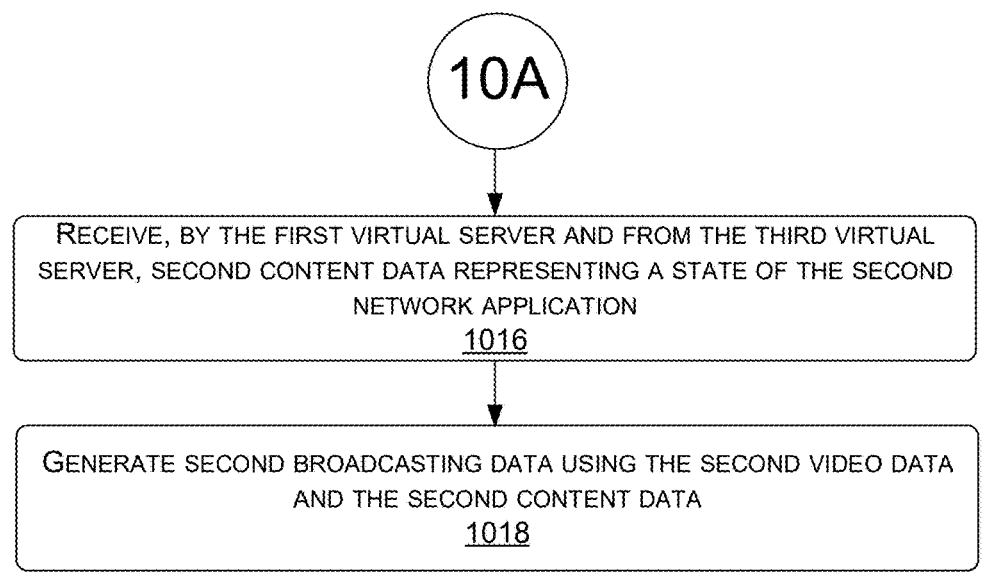

FIGS. 10A-10B illustrate an example process 1000 for broadcasting a game, in accordance with examples of the present disclosure. At 1002, the process 1000 may include launching a broadcasting session on a first virtual server and at 1004, the process 1000 may include launching a first network application on a second virtual server. For instance, the system(s) (e.g., the provisioning component 102) may launch the broadcasting session on the first virtual server 110 and the first network application on the second virtual server 132. The system(s) may then establish a network connection between the first virtual server 110 and the second virtual server 132. Additionally, the system(s) may establish a network connection between the first virtual server 110 and the user device 104 and/or a network connection between the second virtual server 132 and the user device 104.

At 1006, the process 1000 may include receiving, by the first virtual server, first video data from a user device and at 1008, the process 1000 may include receiving, by the first virtual server and from the second virtual server, first content data representing a state of the first network application. For instance, the first virtual server 110 may receive the first video data (and/or first audio data) from the user device 104 and the first content data from the second virtual server 132. As described herein, the first content data may be similar to contend data so that the second virtual server 132 sends to the user device 104 while the user device 104 is communicating with the second virtual server 132.

At 1010, the process 1000 may include generating first broadcasting data using the first video data and the first content data. For instance, the first virtual server 110 may generate the first broadcasting data using the first video data and the first content data. For example, the first broadcasting data may represent a video represented by the first video data overlayed over a portion of the visual content represented by the first content data. The broadcasting data may further include the audio content represented by the first content data. Additionally, in examples where the first virtual server 110 also receives the first audio data from the user device 104, the first broadcasting data may include at least a portion of the first audio data. The first virtual server 110 may then send the first broadcasting data to one or more computing devices for broadcasting to one or more users.

At 1012, the process 1000 may include launching a second network application on a third virtual server. For instance, the system(s) (e.g., the provisioning component 102) may launch the second network application on the third virtual server 308. In some examples, the system(s) launch the second network application based on receiving, from the user device 104, identifier data associated with the second network application. For example, the user may want to switch from accessing the first network application to accessing the second network application. The system(s) may then establish a network connection between the first virtual server 110 and the third virtual server 308. Additionally, in some examples, the system(s) may terminate the network connection between the first virtual server 110 and the second virtual server 132 and/or terminate the first network application on the second virtual server 132.

At 1014, the process 1000 may include receiving, by the first virtual server, second video data from the user device and at 1016, the process 1000 may include receiving, by the first virtual server and from the third virtual server, second content data representing a state of the second network application. For instance, the first virtual server 110 may receive the second video data (and/or second audio data) from the user device 104 and the second content data from the third virtual server 308. As described herein, the second content data may be similar to contend data that the third virtual server 308 sends to the user device 104 while the user device 104 is communicating with the third virtual server 308.

At 1018, the process 1000 may include generating second broadcasting data using the second video data and the second content data. For instance, the first virtual server 110 may generate the second broadcasting data using the second video data and the second content data. For example, the second broadcasting data may represent a video represented by the second video data overlayed over a portion of the visual content represented by the second content data. The second broadcasting data may further include the audio content represented by the second content data. Additionally, in examples where the first virtual server 110 also receives the second audio data from the user device 104, the second broadcasting data may include at least a portion of the second audio data. The first virtual server 110 may then send the second broadcasting data to one or more computing devices for broadcasting to one or more users.

Figure 11:
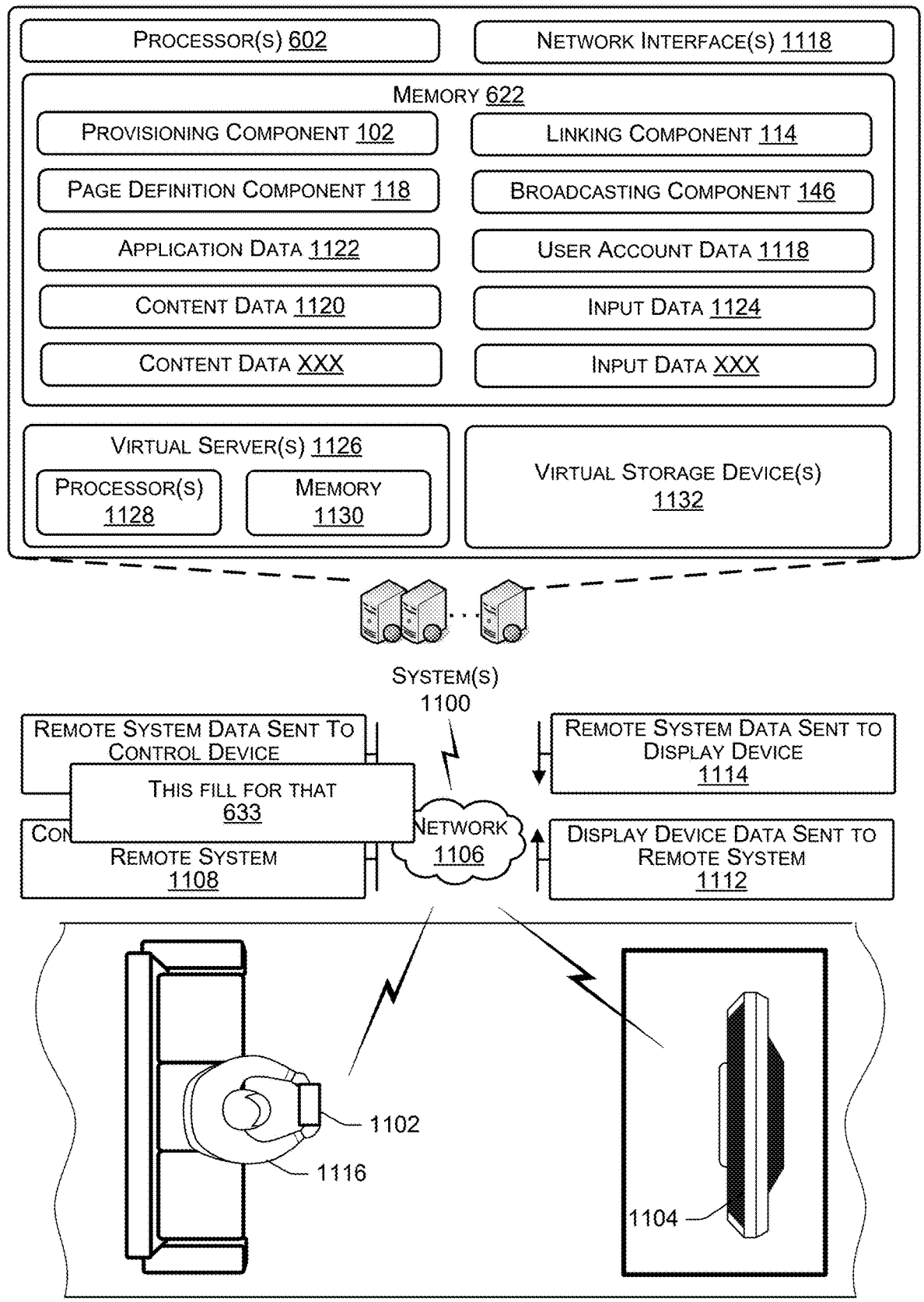
FIG. 11 illustrates a schematic diagram of an example system for controlling network applications, in accordance with examples of the present disclosure.

FIG. 11 is a schematic diagram of an example environment for controlling network applications, in accordance with examples of the present disclosure. The environment may include, for example, system(s) 1100, a control device 1102, and a display device 1104. In the example of FIG. 11, the control device 1102 may communicate with the system(s) 1100 over the network(s) 1106, such as by using a first communication channel. For instance, the control device 1102 may send data to the system(s) 1100 (which is represented by 1108) and the system(s) 1100 may send data to the control device 1102 (which is represented by 1110). Additionally, the display device 1104 may communicate with the system(s) 1100 over the network(s) 1106, such as by using a second communication channel. For instance, the display device 1104 may send data to the system(s) 1100 (which is represented by 1112) and the system(s) 1100 may send data to the display device 1104 (which is represented by 1114).

By sending and receiving data with the control device 1102 and the display device 1104, the system(s) 1100 allow a user 1116 to control, via the system(s) 1100, the network application being displayed by the display device 1104 using the control device 1102. For instance, the control device 1102 may connect to the network(s) 1106, such as by using configuration settings. The control device 1102 may then send, to the system(s) 1100, identifier data representing at least an identifier associated with the control device 1102. The system(s) 1100 may receive the data and determine, using user account data 1118, that the data is received from the control device 1102. For example, the system(s) 1100 may match the identifier represented by the data received from the control device 1102 with an identifier associated with the user account data 1118. Based at least in part on the match, the system(s) 1100 may determine that the data was sent from the control device 1102.

The system(s) 1100 may further determine, using the user account data 1118, that the control device 1102 is associated with at least the display device 1104. For example, and based at least in part on determining that the data was sent from the control device 1102, the system(s) 1100 may analyze the user account data 1118 associated with the user 1116. The system(s) 1100 may then determine that the user account data 1118 includes and/or is associated with data representing an identifier of the display device 1104. Based at least in part on the determination, the system(s) 1100 may determine that the control device 1102 is associated with the display device 1104.

In some instances, the system(s) 1100 may then send, to the display device 1104, content data 1120 (e.g., video data, audio data, etc.) representing one or more network applications that are available to the user 1116, where the network applications are represented by application data 1122. In some instances, the one or more network applications may include one or more applications that have been acquired by the user 1116. Additionally, or alternatively, in some instances, the one or more network applications may include one or more network applications that are free to users. In either example, the display device 1104 may receive the content data 1120 from the system(s) 1100. The display device 1104 may then display image(s) that represent the one or more network applications that are available to the user 1116. For example, the image(s) may include one or more identifiers (e.g., one or more names) of the one or more network applications that are available to the user 1116.

The system(s) 1100 may then receive, from the control device 1102, input data 1124 representing input(s) received by the control device 1102. The system(s) 1100 may analyze the input data 1124 to identify a network application that is selected by the user 1116. For example, the input(s) may correspond to movement(s) of an object, such as a cursor, across the image(s) representing the one or more network applications. The input(s) may further correspond to a selection of one of the network applications (e.g., a selection of a control on the control device 1102 when the object is located over the selected network application). The system(s) 1100 may then determine, based at least in part on the selection, that the user 1116 selected the network application.

The system(s) 1100 may then assign the control device 1102 and/or the display device 1104 with a virtual server 1126 (which may represent, and/or include, the first virtual server 110, the second virtual server 132, and/or the third virtual server 308) associated with the network application. As described herein, a virtual server 1126 may include a server (e.g., computer and server programs) that executes at a remote location and is used to run applications. For example, the virtual server 1126 may include one or more dedicated computing resources, such as processor(s) 1128, memory 1130, storage, network capacity, and/or the like, for running and providing the application. As such, the system(s) 1100 may install the selected network application on the virtual server 1126, either before or after the user 1116 selects the network application. Additionally, the system(s) 1100 may cause a launching of the network application on the virtual server 1126, either before or after the user 1116 selects the network application. In some examples, the launching of the network application occurs using the launch file that includes the command(s) associated with launching the network application. Once the network application is launched, the system(s) 1100 are able to provide content associated with the network application.

For example, the system(s) 1100 may then send, to the display device 1104, content data 1120 representing a first state of the network application. The content data 1120 may include first video data representing image(s) of the first state of the network application, first audio data representing sound corresponding to the first state of the network application, and/or first timestamp data representing a time for displaying the image(s) and/or a time for outputting the sound. The display device 1104 may receive the content data 1120 from the system(s) 1100. Using the first video data, the display device 1104 may display the image(s) representing the first state of the network application. For example, if the network application includes a gaming application, the display device 1104 may display content representing the first state of the game. In the example of FIG. 11, the first state of the game may include an object (e.g., a character) located at a first position in a gaming environment (e.g., a forest). In some instances, the display device 1104 may further output the sound represented by the first audio data.

In some instances, the display device 1104 displays the image(s) and/or outputs the sound according to the time(s) represented by the first timestamp data. For example, the display device 1104 may determine when a current time includes the time represented by the first timestamp data for displaying the first video data. Based at least in part on the determination, the display device 1104 may begin displaying the image(s) representing the first state of the network application. Additionally, the display device 1104 may determine when a current time includes the time represented by the first timestamp data for outputting the sound. Based at least in part on the determination, the display device 1104 may begin outputting the sound represented by the first audio data.

In some instances, the system(s) 1100 may additionally send, to the control device 1102, content data 1120 representing the first state of the network application. The content data 1120 may include second audio data representing sound corresponding to the first state of the network application and/or second timestamp data representing a time for outputting the sound. The control device 1102 may then output the sound represented by the second audio data. In some instances, the control device 1102 may output the sound according to the time represented by the second timestamp data. In some instances, first timestamp data and/or the second timestamp data synchronizes the outputting of the sound by the control device 1102 with the displaying of the image(s) by the display device 1104.

The user 1116 can then use the control device 1102 to provide inputs to the network application. For instance, the control device 1102 may receive an input, such as a selection of a button, joystick, key, touch-sensitive pad, sensor, and/or the like associated with the control device 1102. The control device 1102 may then send, to the system(s) 1100, input data 1124 representing the input. Using the input data 1124, the system(s) 1100 may update the first state of the network application to a second state of the network application. For example, and using the example above where the network application includes the gaming application, the input may be associated with moving the object forward by a given amount within the gaming environment. As such, the system(s) 1100 may analyze the input data 1124 to determine that the input includes moving the object forward by the given amount. The system(s) 1100 may then update the first state of the of the network application to the second state of the network application by moving the object forward in the environment by the given amount.

The system(s) 1100 may then send content data 1120 representing a second state of the network application to the display device 1104. The content data 1120 may include third video data representing image(s) of the second state of the network application, third audio data representing sound corresponding to the second state of the network application, and/or third timestamp data representing a time for displaying the image(s) and/or a time for outputting the sound. The display device 1104 may receive the content data 1120 from the system(s) 1100. Using the third video data, the display device 1104 may display image(s) representing the second state of the network application. For example, and again using the example where the network application includes the gaming application, the display device 1104 may display the object located at the second position within the gaming environment. In some instances, the display device 1104 may further output the sound represented by the third audio data. In some instances, the display device 1104 displays the image(s) and/or outputs the sound according to the time(s) represented by the third timestamp data.

In some instances, the system(s) 1100 may additionally send, to the control device 1102, content data 1120 representing the second state of the network application. The content data 1120 may include fourth audio data representing sound corresponding to the second state of the network application and/or fourth timestamp data representing a time for outputting the sound. The control device 1102 may then output the sound represented by the fourth audio data. In some instances, the control device 1102 may output the sound according to the time represented by the fourth timestamp data. In some instances, third timestamp data and/or the fourth timestamp data synchronizes the outputting of the sound by the control device 1102 with the displaying of the image(s) by the display device 1104.

In some instances, the system(s) 1100 may continue to receive input data 1124 from the control device 1102. The system(s) 1100 may then continue to process the input data 1124 in order to update the state of the network application. Based at least in part on the updating, the system(s) 1100 may continue to send, to the display device 1104, content data 1120 (e.g., video data, audio data, timestamp data, etc.) representing the current state of the network application. The system(s) 1100 may further send, to the control device 1102, content data 1120 (e.g., audio data, timestamp data, etc.) representing the current state of the network application. In other words, the system(s) 1100 allow the user 1116 to access the network application that is executing on the virtual server 1124.

As further illustrated in the example of FIG. 11, the system(s) 1100 may store virtual storage device(s) 1132. As described herein, a virtual storage device 1132 may include a storage volume, such as an EBS, that is stored remotely (e.g., a cloud-based storage) from user devices. In some examples, the system(s) 1100 may generate different types of virtual storage devices 1132. For example, the system(s) 1100 may generate solid-state drives, hard disk drive, and/or any other type of remote storage drives. After the system(s) 1100 generate the virtual storage device 1132, the system(s) 1100 may create a file system on the virtual storage device 1132, run a database on the virtual storage device 1132, store a network application on the virtual storage device 1132 (e.g., such as the application data 1122 representing a network application), and/or perform one or more additional and/or alternative processes with the virtual storage device 1132.

For example, the system(s) 1100 may store the selected network application on the virtual storage device 1132. The system(s) 1100 may then use the virtual storage device 1132 to install the network application on the virtual server 1126. Additionally, in order to provide the network application to multiple users, the system(s) 1100 may copy the network application by taking a point-in-time copy of the virtual storage device 1132, where the point-in-time copy generates multiple virtual storages devices 1132 that each store the network application. The system(s) 1100 may then use the virtual storage devices 1132 to install the network application on multiple virtual servers 1126.

As further illustrated in the example of FIG. 11, the system(s) 1100 may store access data 1134. As described herein, the system(s) 1100 (e.g., the virtual server(s) 1126, the components, etc.) may use tokens and/or keys in order to generate requests, link accounts, provide broadcasting content, and/or the like. As such, the access data 1134 may represent the tokens and/or keys used by the system(s) to perform the processes described herein. For a first example, the access data 1134 may represent the stream key that the system(s) use to stream the broadcasting data to the linked user account. For a second example, the access data 1134 may represent the access token(s) that the system(s) use to create the link with the user account. For a third example, the access data 1134 may represent the token that the system(s) (e.g., the provisioning component 102) receive for creating the broadcasting session and/or the token that the system(s) (e.g., the provisioning component 102) receive for creating the application session.

The system(s) 1100 may further store credential data 1136. The credential data 1136 may represent the credentials that the system(s) 1100 use to create the links with the third-party accounts. As described herein, the credentials may include, but are not limited to, a username, a password, and/or any other information for accessing (e.g., logging into) a third-party account.

The system(s) 1100 may also include processor(s) 1140, network interface(s) 1142, and memory 1144. As used herein, a processor may include multiple processors and/or a processor having multiple cores. Further, the processors may comprise one or more cores of different types. For example, the processors may include application processor units, graphic processing units, and so forth. In one instance, the processor may comprise a microcontroller and/or a microprocessor. The processor(s) may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s)

may possess its own local memory, which also may store program components, program data, and/or one or more operating systems.

Memory may include volatile and nonvolatile memory, removable and non-removable media implemented in any method or technology for storage of information, such as computer-readable instructions, data structures, program component, or other data. The memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory may be implemented as computer-readable storage media ("CRSM"), which may be any available physical media accessible by the processor(s) to execute instructions stored on the memory. In one basic instance, CRSM may include random access memory ("RAM") and Flash memory. In other instances, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Washington, USA; the Windows operating system from Microsoft Corporation of Redmond, Washington, USA; LynxOS as promulgated by Lynx Software Technologies, Inc. of San Jose, California; Operating System Embedded (Enea OSE) as promulgated by ENEA AB of Sweden; and so forth.

Network Interface(s) may enable communication of data between the electronic device and one or more other remote systems, as well as other networked devices. The network interface(s) may include one or more network interface controllers (NICs) or other types of transceiver devices to send and receive messages over the network(s). For instance, each of the network interface(s) may include a personal area network (PAN) component to enable messages over one or more short-range wireless message channels. For instance, the PAN component may enable messages compliant with at least one of the following standards IEEE 802.15.4 (ZigBee), IEEE 802.15.1 (Bluetooth), IEEE 802.11 (WiFi), or any other PAN message protocol. Furthermore, each of the network interface(s) may include a wide area network (WAN) component to enable message over a wide area network.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

The invention claimed is:

1. A method comprising:
receiving, by a first virtual server and from a user device, a request to create a broadcasting session;
launching the broadcasting session on the first virtual server;
establishing a first connection between the first virtual server and the user device;
receiving, by the first virtual server and from the user device, identifier data associated with a game;
based at least in part on receiving the identifier data, launching the game on a second virtual server;
establishing a second connection between the first virtual server and the second virtual server;
establishing a third connection between the second virtual server and the user device;
receiving, by the first virtual server and using the second connection, content data from the second virtual server;
receiving, by the first virtual server and using the first connection, image data from the user device;
generating, by the first virtual server, broadcast content using at least the image data and the content data, wherein the broadcast data includes an image represented by the image data overlayed over a portion of content represented by the content data; and
sending, to one or more computing devices, broadcast data representing the broadcast content.

2. The method of claim 1, further comprising:
receiving, by the first virtual server and using the first connection, audio data representing user speech; and
wherein generating, by the first virtual server, the broadcast content further comprises using at least the image data and the audio data.

3. The method of claim 1, further comprising:
receiving, by the first virtual server and from the user device, second identifier data associated with a second game;
based at least in part on receiving the second identifier data, launching the second game on a third virtual server;
establishing a fourth connection between the first virtual server and the third virtual server;
receiving, by the first virtual server and using the fourth connection, second content data from the third virtual server;
receiving, by the first virtual server and using the first connection, second image data from the user device;
generating, by the first virtual server, second broadcast content using the second image data and the second content data; and sending, to the one or more computing devices, second broadcast data representing the second broadcast content.

4. A method comprising:
receiving, by a first virtual server and from a user device, a request to create a broadcasting session;
launching the broadcasting session on the first virtual server;
establishing a first connection between the first virtual server and the user device;
establishing a second connection between the first virtual server and a second virtual server;
launching a game on the second virtual server;
establishing a third network connection between the second virtual server and the user device;
receiving, by the first virtual server and using the first connection, image data from the user device;
receiving, by the first virtual server and using the second connection, content data from the second virtual server;
generating broadcast data using at least the image data and the content data, wherein the broadcast data includes an image represented by the image data overlayed over a portion of content represented by the content data; and
sending the broadcast data to one or more computing devices.

5. The method of claim 4, further comprising:
receiving, by the first virtual server and using the first connection, audio data representing user speech; and
wherein generating, by the first virtual server, the broadcast data further comprises using at least the image data and the audio data.

6. The method of claim 4, wherein the image represented by the image data and overlayed over the portion of content represented by the content data is video depicting a user of the user device.

7. The method of claim 4, further comprising receiving, by the first virtual server and from the user device, configuration data associated with the broadcast session, the configuration data indicating at least the portion of the content for overlaying the image, wherein generating the broadcast data further uses the configuration data.

8. The method of claim 4, further comprising:
receiving, by the first virtual server and using the first connection, second image data from the user device;
receiving, by the first virtual server and using the second connection, second content data from the second virtual server;
generating second broadcast data using at least the second image data and the second content data; and
sending the second broadcast data to the user device.

9. The method of claim 8, further comprising:
while sending the second broadcast data to the user device, receiving, from the user device, a request to begin broadcasting the game,
wherein sending the broadcast data to the one or more computing devices is based at least in part on receiving the request.

10. The method of claim 4, further comprising:
receiving, by the first virtual server and using the first connection, second image data from the user device;
receiving, by the first virtual server and using the second connection, second content data from the second virtual server;
generating second broadcast data using at least the second image data and the second content data; and
sending the second broadcast data to the one or more computing devices.

11. The method of claim 4, further comprising:
establishing a fourth connection between the first virtual server and a second user device;
receiving a request to switch broadcasting from the user device to the second user device;
based at least in part on receiving the request, receiving, by the first virtual server and using the fourth connection, second image data from the second user device;
receiving, by the first virtual server and using the second connection, second content data from the second virtual server;
generating second broadcast data using at least the second image data and the second content data; and
sending the second broadcast data to the one or more computing devices.

12. The method of claim 4, further comprising:
terminating the second connection between the first virtual server and the second virtual server;
establishing a fourth connection between the first virtual server and a third virtual server, the third virtual server being associated with a second game;
receiving, by the first virtual server and using the first connection, second image data from the user device;
receiving, by the first virtual server and using the fourth connection, second content data from the third virtual server;
generating, by the first virtual server, second broadcast data using at least the second image data and the second content data; and
sending the second broadcast data to the one or more computing devices.

13. The method of claim 4, further comprising receiving, by the first virtual server and using the first connection, audio data from the user device, wherein generating the broadcast data further uses the audio data.

14. The method of claim 4, wherein the image data comprises video data representing a video depicting a user.

15. The method of claim 4, further comprising:
receiving, by the first virtual server, configuration data from a second user device;
receiving, by the first virtual server and using the first connection, second image data from the user device;
receiving, by the first virtual server and using the second connection, second content data from the second virtual server;
generating, based at least in part on the configuration data, second broadcast data using at least the second image data and the second content data; and
sending the second broadcast data to the one or more computing devices.

16. The method of claim 4, further comprising:
receiving, by the second virtual server, input data from the user device;
generating the content data based at least in part on the input data; and
sending, by the second virtual server, the content data to the user device.

17. A first virtual server comprising:
one or more processors; and
one or more computer-readable media storing instructions that, when executed by the one or more processors, cause the first virtual server to perform operations comprising:
receiving a request from a user device to create a broadcasting session;

launching the broadcasting session;
establishing a first connection with the user device;
establishing a second connection with a second virtual server, wherein the second virtual server is connected to the user device via a third connection;
launching a game on the second virtual server;
receiving, using the first connection, image data from the user device;
receiving, using the second connection and from the second virtual server, content data;
generating broadcast data based at least in part on the image data and the content data, wherein the broadcast data includes an image represented by the image data overlayed over a portion of content represented by the content data; and
sending the broadcast data to one or more computing devices.

18. The first virtual server of claim 17, the operations further comprising:
establishing a fourth connection with a second user device;
receiving, using the fourth connection, second image data from the second user device;
receiving, using the second connection, second content data from the second virtual server;
generating second broadcast data based at least in part on the second image data and the second content data; and
sending the second broadcast data to the one or more computing devices.

19. The first virtual server of claim 17, the operations further comprising:
terminating the second connection with the second virtual server;
establishing a fourth connection with a third virtual server, the third virtual server being associated with a second game;
receiving, using the first connection, second image data from the user device;
receiving, using the fourth connection and from the third virtual server, second content data representing a state of the second game;
generating second broadcast data based at least in part on the second image data and the second content data; and
sending the second broadcast data to the one or more computing devices.

20. The first virtual server of claim 17, wherein the image represented by the image data and overlayed over the portion of content represented by the content data is video depicting a user of the user device.

* * * * *